(12) United States Patent
Koyama et al.

(10) Patent No.: US 9,094,683 B2
(45) Date of Patent: Jul. 28, 2015

(54) METHOD OF CODING MOVING IMAGE AND METHOD OF DECODING MOVING IMAGE

(75) Inventors: Junpei Koyama, Shibuya (JP); Akihiro Yamori, Kawasaki (JP); Kimihiko Kazui, Kawasaki (JP); Satoshi Shimada, Kawasaki (JP); Akira Nakagawa, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 396 days.

(21) Appl. No.: 13/602,415

(22) Filed: Sep. 4, 2012

(65) Prior Publication Data

US 2013/0128976 A1 May 23, 2013

(30) Foreign Application Priority Data

Nov. 18, 2011 (JP) .................................. 2011-253107

(51) Int. Cl.
H04N 19/00 (2014.01)
H04N 19/16 (2014.01)
H04N 19/513 (2014.01)
H04N 19/107 (2014.01)
H04N 19/112 (2014.01)

(52) U.S. Cl.
CPC ............. *H04N 19/16* (2014.11); *H04N 19/513* (2014.11); *H04N 19/107* (2014.11); *H04N 19/112* (2014.11)

(58) Field of Classification Search
USPC .................................................. 375/240.16
See application file for complete search history.

(56) References Cited

U.S. PATENT DOCUMENTS

2010/0054335 A1* 3/2010 Yamori et al. ........... 375/240.16

FOREIGN PATENT DOCUMENTS

JP 2010-62769 3/2010

OTHER PUBLICATIONS

ISO/IEC 13818, "Generic coding of moving pictures and associated audio information" Feb. 2000 (pp. 1-220).
ISO/IEC 14496-10, "Advanced Video Coding for generic audiovisual services" Nov. 2007 (pp. 1-564).
Joint Collaborative Team on Video Coding (JCT-VC) of ITU-T SG16 WP3 and ISO/IEC JTC1/SC29/WG11, "WD4: Working Draft 4 of High-Efficiency Video Coding" Jul. 14, 2011 (pp. 1-230).
Japanese Office Action issued Apr. 28, 2015 in corresponding Japanese Patent Application No. 2011-253107.
Jumpei Koyama et al., "Modification of derivation process of motion vector information for interlace format", Joint Collaborative Team on Video Coding (JCT-VC) of ITU-T SG16 WP3 and ISO/IEC JTC1/SC29/WG11, 7th Meeting: Geneva, CH Nov. 21-30, 2011, pp. 1-7.

* cited by examiner

*Primary Examiner* — Sath V Perungavoor
*Assistant Examiner* — Jeffery Williams
(74) *Attorney, Agent, or Firm* — Staas & Halsey LLP

(57) ABSTRACT

A method includes extracting a first vector used to code a specific block belonging to a coded field picture arranged chronologically adjacent to a field picture to be coded and to a block to be coded, generating a second vector by scaling the first vector based on a temporal distance between the field picture and a second picture specified by a reference index and referenced for the block and included in the field picture and a temporal distance between a first picture pointed by the first vector and the coded field picture arranged chronologically adjacent to the field picture, and correcting the second vector based on a parity of the field picture, a parity of the first picture, a parity of the second picture and a parity of the coded field picture and forming the corrected second vector.

10 Claims, 21 Drawing Sheets

FIG. 8A

| INDEX | CODED DATA |
|---|---|
| 0 | 1 |
| 1 | 01 |
| 2 | 001 |
| 3 | 0001 |
| 4 | 0000 |

WHEN (MAXIMUM) NUMBER OF CANDIDATES IS 5

FIG. 8B

| INDEX | CODED DATA |
|---|---|
| 0 | 1 |
| 1 | 01 |
| 2 | 00 |

WHEN (MAXIMUM) NUMBER OF CANDIDATES IS 3

METHOD OF CODING MOVING IMAGE AND METHOD OF DECODING MOVING IMAGE

CROSS-REFERENCE TO RELATED APPLICATION

This application is based upon and claims the benefit of priority of the prior Japanese Patent Application No. 2011-253107, filed on Nov. 18, 2011, the entire contents of which are incorporated herein by reference.

FIELD

The embodiments discussed herein are related to a method of coding a moving image and a method of decoding a moving image.

BACKGROUND

In general, the amount of image data, especially, the amount of moving image data is large. Before such image data is transmitted from a transmitting device to a receiving device or before such image data is stored in a storage device, the image data is coded using high-efficiency coding. The "high-efficiency coding" is a coding process of compressing a data string so as to reduce the amount of the data string and convert the data string into another data string. As methods for performing the high-efficiency coding on moving image data, an intra-frame prediction coding method and an inter-frame prediction method are known. The intra-frame prediction coding method is performed using a characteristic that moving image data has a high correlation in a spatial direction. For example, the intra-frame prediction coding method is a method for coding and decoding an image using information of the image to be coded without another image. The inter-frame prediction coding method is performed using a characteristic that moving image data has a high correlation in the time direction. In general, images that are included in moving image data and chronologically close to each other have a similarity with each other. Thus, when a coded image is referenced and an image is coded on the basis of the referenced coded image, redundancy of the images may be removed.

As illustrated in FIG. 1, in the inter-frame prediction coding method, a block CB1 that is to be coded and is obtained by dividing an image Pic2 to be coded into blocks is coded by referencing a preceding reference image Pic1 coded and decoded for reference. Specifically, a region of a preceding reference block FB1 that is included in the preceding reference image Pic1 and similar to the block CB1 to be coded is selected. A predicted deviation generator 110 calculates the difference between the preceding reference block FB1 and the block CB1 to be coded and removes redundancy of the blocks FB1 and CB1. Information of a forward motion vector MV1 directed to the similar region FB1, and information of the difference between the blocks from which the redundancy has been removed, are coded, and whereby a high compression rate is achieved.

For example, in a data transmission system that uses inter-frame prediction coding, a transmitting device generates motion vector data indicating a "motion" from a preceding image to an image to be coded, and differential data indicating the difference between the image to be coded and a predicted image generated using the preceding image and the motion vector data, and transmits the motion vector data and the differential data to a receiving device. The receiving device restores the image to be decoded from the received motion vector data and the received differential data.

The forward prediction is described above as an example. Backward prediction is performed basically in a similar manner to the forward prediction. The backward prediction is different from the forward prediction in that an image that chronologically follows an image to be coded is referenced in the backward prediction. In bi-directional prediction, results that are obtained by separately performing the forward prediction and the backward prediction are used. Thus, in the bi-directional prediction, the aforementioned effects may be obtained.

Representative moving image coding schemes are ISO/IEC MPEG-2 and ISO/IEC MPEG-4 (hereinafter referred to MPEG-4).

A representative moving image coding device is described with reference to FIG. 2. As illustrated in FIG. 2, a moving image coding device 200 includes a predicted deviation generator 201, a converter 202, a quantization unit 203, an entropy encoder 204, an inverse quantization unit 205, an inverter 206, a decoded image generator 207, a decoded image accumulation unit 208, a predicted coded image block generator 209 and a predicted image selector 212. The outlines of the functional units of the moving image coding device 200 are described below.

The predicted deviation generator 201 generates a predicted deviation on the basis of both block data obtained by dividing the original input image data into blocks having a certain size and block data (prediction signal) of a predicted image supplied from the predicted coded image block generator 209. The predicted deviation generator 201 supplies the generated predicted deviation to the converter 202.

The converter 202 converts the received predicted deviation into a frequency component in a horizontal direction and a frequency component in a vertical direction and outputs the predicted deviation divided into the frequency components to the quantization unit 203. The quantization unit 203 quantizes the output of the converter 202. The quantization unit 203 performs the coding, thereby reduces the amount of the predicted deviation to be coded, and outputs the predicted deviation to the entropy encoder 204 and the inverse quantization unit 205.

The entropy encoder 204 performs entropy coding (variable length coding, arithmetic coding or the like) on the output of the quantization unit 203 and additional information that describes coding parameters such as motion vectors used for coding. The entropy encoder 204 outputs the additional information and the predicted deviation. The entropy coding is a scheme of assigning a variable-length code on the basis of an appearance frequency of a symbol.

The inverse quantization unit 205 inversely quantizes the output of the quantization unit 203 and outputs the predicted deviation to the inverter 206. The inverter 206 performs inverse conversion on the output of the inverse quantization unit 205 and outputs the predicted deviation to the decoded image generator 207. The inverse quantization unit 205 and the inverter 206 decode the predicted deviation and thereby obtain a predicted deviation that is the same as or similar to the predicted deviation before the coding.

The decoded image generator 207 adds the block data of the predicted image generated by the predicted coded image block generator 209 to the predicted deviation decoded by the inverse quantization unit 205 and the inverter 206, thereby decodes data of the blocks of the coded original image data, and outputs the decoded data to the decoded image accumulation unit 208.

The decoded image accumulation unit 208 stores the received decoded image block data as data of a new reference image. In addition, the decoded image accumulation unit 208 stores the additional information describing the coding parameters including the motion vectors used for coding. The stored decoded image block data is supplied to the predicted coded image block generator 209.

The predicted coded image block generator 209 includes an intra-frame prediction image generator 210 and an inter-frame prediction image generator 211. The predicted coded image block generator 209 generates block data of a predicted image corresponding to an image to be coded, and outputs, to the entropy encoder 204 and the decoded image accumulation unit 208, the additional information describing the coding parameters including the motion vectors used for coding.

The intra-frame prediction image generator 210 generates block data of an image predicted using intra-frame coding (intra-frame prediction). The inter-frame prediction image generator 211 calculates a motion vector using both block data of the original image to be coded and decoded image block data acquired from the decoded image accumulation unit 208. The motion vector is a value that indicates a spatial deviation of a block that is included in a reference image and most similar to a block of the original image from the block of the original image. The spatial deviation is represented on a block basis and calculated using a block matching technique for searching a block that is included in a reference image and most similar to a block of the original image. The inter-frame prediction image generator 211 uses the calculated motion vector to perform motion compensation on the image data acquired from the decoded image accumulation unit 208, and thereby generates block data of a predicted image.

The predicted coded image block generator 209 supplies block data of a predicted image generated by any of the intra-frame prediction image generator 210 and the inter-frame prediction image generator 211 through the predicted image selector 212 to the predicted deviation generator 201 and the decoded image generator 207.

Next, the inter-frame prediction image generator 211 is described in detail.

As illustrated in FIG. 3, the inter-frame prediction image generator 211 receives block data to be coded, a decoded image stored in the decoded image accumulation unit 208, and the additional information describing the coding parameters including the motion vectors used for coding, and includes an adjacent position specifying information generator 308, a predicted pattern generator 309, a predicted motion vector candidate generator 301, a motion search unit 302 and a motion compensation unit 303. The intra-frame prediction image generator 211 outputs an inter-frame prediction image.

The motion search unit 302 includes a motion vector candidate generator 304, a deviation calculator 305, a search result accumulation unit 306 and a motion vector selector 307.

The block to be coded includes information of coding parameters such as a pixel value, a time (picture order count (POC)) to display an image, the position of the block to be coded, and the size of the block to be coded.

The decoded image includes additional information that includes a pixel value of the decoded image, a time (POC) to display the image, the sizes of divided blocks and a prediction mode (intra-frame prediction mode or inter-frame prediction mode) and describes coding parameters including motion vectors used to code the image.

The outlines of the functional units of the intra-frame prediction image generator 211 are described below.

The adjacent position specifying information generator 308 outputs, to the predicted vector candidate generator 301, information that uses an index to specify the position of an adjacent block from which a motion vector that is used as a predicted motion vector in order to code the block (to be coded) is obtained. The position of the adjacent block is determined in advance on the basis of the position of the block to be coded. Thus, special data is not input to the intra-frame prediction image generator 211 (for example, in accordance with a standard).

The predicted pattern generator 309 outputs prediction information and a reference index to the predicted vector candidate generator 301. The prediction information specifies a list that is to be used and among a plurality of lists of coded pictures to be used for motion prediction. The reference index specifies a picture that is to be used for motion prediction and is included in the list specified by the prediction information. The moving image coding device 200 searches a combination from various combinations of various types of prediction information and reference indexes in order to calculate the most appropriate motion vector. The combination may be determined in advance by a user who uses the moving image coding device 200 that performs the coding. The combination may be adaptively changed on the basis of the state of the coding. Hereinafter, it is assumed that the combination of the prediction information and the reference index is determined in advance by the user and output from the predicted pattern generator 309 to the predicted vector candidate generator 301.

The predicted vector candidate generator 301 receives the block to be coded, the decoded image, the information output from the adjacent position specifying information generator 308, and the coding parameters output from the predicted pattern generator 309. The predicted vector candidate generator 301 extracts predicted motion vector candidates that are to be used as predicted motion vectors of the block to be coded and have been used to code a plurality of blocks that are chronologically and spatially adjacent to the block to be coded.

The motion vector candidate generator 304 receives the block to be coded, the predicted motion vector candidates and the prediction information, and generates motion vector candidates that are used for a motion search and directed from the block (to be coded) included in the image to be coded to reference blocks included in the decoded image supplied from the external decoded image accumulation unit 208.

The deviation calculator 305 receives the block to be coded, the decoded image and the motion vector candidates and calculates deviations of the block to be coded from the reference blocks that are included in the decoded image and specified by the motion vector candidates.

The search result accumulation unit 306 receives the motion vector candidates and the deviations and accumulates information of the deviations supplied from the deviation calculator 305 and information of the motion vector candidates corresponding to the information of the deviations.

The motion vector selector 307 receives the motion vector candidates and the deviations corresponding to the motion vector candidates, selects the smallest deviation from among the deviation information supplied from the search result accumulation unit 306, and outputs a motion vector candidate corresponding to the selected deviation.

The motion compensation unit 303 receives the motion vector candidate output from the motion vector selector 307 and the decoded image, selects a reference block included in the decoded image on the basis of the motion vector candidate output from the motion vector selector 307, and outputs the selected reference block as an inter-frame prediction image.

The predicted motion vector candidate generator 301 is described below in detail.

FIG. 4 is a diagram illustrating the configuration of the related-art predicted motion vector generator 301.

The predicted motion vector generator 301 receives the information specifying the position of the adjacent block, picture information of the block to be coded, the prediction information, information of pictures of decoded images, the reference index and a motion vector that belongs to a block arranged adjacent to the block to be coded and is acquired from a motion vector storage unit. The predicted motion vector generator 301 includes a standard vector generator 401 and a scaling unit 402 and outputs a predicted motion vector. The information received by the predicted motion vector generator 301 is information included in the decoded images received by the inter-frame prediction image generator 211 (illustrated in FIG. 3), the block to be coded, and setting data received from the adjacent position specifying information generator 308 and the predicted pattern generator 309.

The standard vector generator 401 extracts, as a standard vector, a motion vector of the adjacent block from motion vectors received from the decoded image accumulation unit 208 on the basis of the information specifying the position of the block arranged adjacent to the block to be coded. The scaling unit 402 scales the standard vector on the basis of both picture information of the block to be coded and information of the pictures included in the decoded images and selected on the basis of the reference index and the prediction information and outputs a predicted motion vector.

Detailed operations of the related-art predicted motion vector candidate generator 301 are described below.

The moving image coding device 200 codes blocks of an image using raster scanning or z scanning in order from a block arranged on the top left side of the image to a block arranged on the bottom right side of the image in general. In the moving image coding device 200, a motion vector of an adjacent block may be used to predict a motion vector of the block to be coded, while the adjacent block is a coded block that is arranged on the left or upper side of the block to be coded and adjacent to the block to be coded. In relation to the adjacent block, a block (that may be referenced) that may be used to predict a motion vector of a block to be decoded during decoding of the block (to be decoded) is a block whose vector has been already decoded and that is arranged on the left or upper side of the block to be decoded and adjacent to the block to be decoded.

In relation to MPEG-4 AVC/H.264, a predicted motion vector may be determined using motion vectors of images coded and decoded in the past without an image to be coded, according to "ISO/IEC 13818, Generic coding of moving pictures and associated audio information".

As a technique related to a method for determining a predicted motion vector, a technique for high efficiency moving coding (hereinafter referred to as HEVC) is disclosed in "ISO/IEC 14496-10, MPEG-4 Part 10 Advanced Video Coding". Standardization of the HEVC is being jointly promoted by International Organization for Standardization/International Electrotechnical Commission (ISO/IEC) and International Telecommunication Union Telecommunication Standardization Sector (ITU-T). In addition, high efficiency video coding test model (HM) software (version 4.0) is disclosed as reference software.

The outline of a predicted motion vector generator that uses HEVC is described below. In HEVC, two lists L0 and L1 are provided as lists (hereinafter referred to as reference image lists) of images that may be referenced. For each of blocks to be coded, motion vectors corresponding to the reference image lists L0 and L1 enable up to two reference image regions to be used for inter-frame prediction. In general, the reference image lists L0 and L1 correspond to times to display the images. For example, the reference image list L0 is a list of reference images preceding an image to be coded, while the reference image list L1 is a list of reference images succeeding the image to be coded. Each of entries of the reference image lists includes information that includes the position of stored pixel data of an image, and a time (picture order count (POC)) to display the image. The POC is an integer value indicating the order that the interested image is displayed and a relative time to display the interested image. When a time to display an image whose POC is 0 is set to 0, a time to display a certain image may be represented as the integral multiple of the POC of the certain image. For example, when frames are displayed at a frequency fr (Hz) and a POC of an image is p, a time to display the image is represented by Formula (1). Thus, a POC may be treated as a time to display an image, while the unit of the POC is seconds.

$$p \cdot fr/2 \qquad (1)$$

When each of the reference image lists has two or more entries, each of motion vectors references a reference image specified by an index number (reference index) included in the reference image list. When each of the reference image lists has one entry for one image, a reference index for a motion vector corresponding to the list is automatically set to 0 and may not explicitly specify a reference image. In this case, a motion vector of a block includes an L0/L1 list identifier, a reference index and data of a vector (Vx, Vy). A reference image is specified by the L0/L1 list identifier and the reference index. The vector (Vx, Vy) specifies a reference region included in the reference image. The length Vx of the vector indicates the difference between a coordinate of the reference region and a coordinate of the current block in a horizontal direction, while the length Vy of the vector indicates the difference between a coordinate of the reference region and a coordinate of the current block in a vertical direction. The lengths Vx and Vy are represented on a quarter pixel basis. The L0/L1 list identifier and the reference index are treated as a reference image identifier, while the lengths Vx, Vy are referred to as a vector data item.

A method for determining a predicted motion vector to be used in HEVC is described. In HEVC, a method for determining a predicted motion vector has two modes that are a merge mode and a motion vector prediction (MVP) mode.

First, the MVP mode is described.

A predicted motion vector is determined for each of reference images specified by L0/L1 list identifiers and reference indexes. When a reference image list is LX, a reference index is refIdx, and a vector data item mvp of a motion vector predicted as a motion vector specifying a reference image specified by the reference image list LX and the reference index refIdx is to be determined, up to three vector data items are calculated as predicted motion vector candidates.

Blocks that are spatially and chronologically adjacent to a block to be coded are classified into three groups that are a block group arranged on the left side of the block to be coded, a block group arranged on the upper side of the block to be coded and a block group arranged chronologically adjacent to the block to be coded. Up to one predicted motion vector candidate is selected from each of the three groups. The selected predicted motion vector candidates are listed in the order of the group arranged on the left side, the group arranged on the upper side and the chronologically adjacent group. In High Efficiency Video Coding Test Model (HM) 4.0, up to two candidates are selected from the three groups and listed in a prediction information candidate list. This prediction information candidate list is treated as an array MvpCand. If a predicted motion vector candidate does not exist in each of the groups, a zero vector is added to the array MvpCand. A predicted motion vector candidate index MvpIdx is used as an identifier that identifies a candidate that is included in the prediction information candidate list and used as the predicted motion vector. For example, the vector data item mvp is a vector data item of the predicted motion vector candidate entered in the MvpIdx-th entry in the array MvpCand.

It is assumed that, in the moving image coding device, when a motion vector that references the reference index refIdx of the reference image list LX for the block to be coded is a motion vector mv, a candidate that is closest to the motion vector my is searched from the array MvpCand, and an index of the candidate is an index MvpIdx. A differential vector mvd is calculated according to Equation (2). The reference index refIdx, the differential vector mvd and the index MvpIdx are coded as motion vector information of the reference image list LX and transmitted to a moving image decoding device.

$$mvd=mv-mvp \quad (2)$$

The moving image decoding device decodes the reference index refIdx, the differential vector mvd and the index MvpIdx, determines the array MvpCand on the basis of the reference index refIdx, and treats the predicted motion vector mvp as an MvpIdx-th predicted motion vector candidate. The moving image decoding device restores the motion vector my of the block to be processed according to Equation (3).

$$mv=mvd+mvp \quad (3)$$

Next, a procedure for selecting predicted motion vectors on the basis of blocks arranged on the left side of a block to be processed and blocks arranged on the upper side of the block to be processed is described with reference to FIG. 5. In HEVC and H.264, the minimum block is determined in advance for motion compensation, and the size of each of all blocks is a value obtained by multiplying 2 raised to an integral power by the size of the minimum block. When the size of the minimum block is represented by MINX and MINY, the size of each of the blocks in the horizontal direction and the size of each of the blocks in the vertical direction are represented by Equations (4) and (5), where n and m are integers, n≥0 and m≥0.

$$MINX \cdot 2^n \quad (4)$$

$$MINY \cdot 2^m \quad (5)$$

In HEVC and H.264, MINX is 4 pixels and MINY is 4 pixels. Thus, each of the blocks may be divided into blocks whose sizes are equal to the minimum block size. In FIG. 5, blocks A0, A1, B0, B1 and B2 are the minimum blocks arranged adjacent to a block to be processed. When one of the minimum blocks is specified, a block that includes the minimum block is uniquely determined.

In a procedure for selecting a predicted motion vector candidate from the blocks arranged on the left side of the block to be processed, the following motion vector is selected if the motion vector is found in the reference image list LX. The motion vector has the same reference index as the reference index refIdx and belongs to a block that includes the minimum block A0 that is among the blocks arranged on the left side of the block to be processed and is arranged on the bottom left side of the block to be processed. If the motion vector is not found, and another motion vector that references the same reference image as the reference image indicated by the reference index refIdx of the reference image list LX is found in a reference image list LY that is different from the reference image list LX, the other motion vector is selected. If the other motion vector is not found, and another motion vector that belongs to a block including the block A1 and has the same reference index as the reference index refIdx is found in the reference image list LX, the other motion vector is selected. If the other motion vector is not found, and another motion vector that belongs to the block including the block A1 and references the same reference image as the reference image indicated by the reference index refIdx of the reference image list LX is found in the reference image list LY, the other motion vector is selected. If the other motion vector is not found, and another motion vector that belongs to the block including the block A0 exists, the other motion vector is selected. If the other motion vector is not found, and another motion vector that belongs to the block including the block A1 exists, the other motion vector is selected. If a motion vector that references the same reference image as the reference image indicated by the reference index refIdx of the reference image list LX is not selected, a scaling calculation (described later) is performed on a motion vector selected in the aforementioned procedure.

In a procedure for selecting a predicted motion vector candidate from the blocks that are arranged on the upper side of the block to be coded and are adjacent to the block to be coded, a motion vector of any of blocks including the blocks B0 to B2 arranged on the upper side is selected in a similar manner to the procedure performed on the blocks A0 and A1. If a motion vector that references the same reference image as the reference image indicated by the reference index refIdx of the reference image list LX is not selected, the scaling calculation (described later) is performed.

A procedure for selecting a predicted motion vector candidate from blocks arranged chronologically adjacent to a block to be coded is described below. First, a reference image that is called a collocated picture (hereinafter referred to as picture ColPic) and arranged chronologically adjacent to an image to be coded is specified as an image including a block arranged chronologically adjacent to the block to be coded. An image indicated by a reference index 0 of any of the reference image lists L0 and L1 is the picture ColPic. Normally, an image indicated by a reference index 0 of the reference image list L1 is the picture ColPic. A block that is included in the picture ColPic and close to a block to be used for motion prediction is a block Col.

The positional relationship between the block to be used for motion prediction and the block Col is illustrated in FIG. 6. A block that is included in the picture ColPic and includes the minimum block TR or TC is the block Col. First, the minimum block TR is prioritized over the minimum block TC. When the intra-frame prediction mode or the inter-frame prediction mode is set for a block that includes the minimum block TR, a block that includes the minimum block TC is the block Col.

A motion vector of the block Col is indicated by mvCol. The motion vector mvCol is scaled by a scaling method (described later) and output as a predicted motion vector candidate.

The method for scaling a motion vector is described below. An input motion vector is indicated by my (mvx, mvy), while an output motion vector is indicated by mv' (mvx', mvy'). The motion vector my references an image ColRefPic. A POC of an image that has the motion vector my is indicated by ColPicPoc, while a POC of the image ColRefPic is indicated by ColRefPoc. A POC of the current image to be coded is indicated by CurPoc, while a POC of an image specified by the reference image list LX and the reference index RefIdx is indicated by CurrRefPoc. When the motion vector to be scaled is a motion vector of a block arranged spatially adjacent to a block to be coded, the POC ColPicPoc is equal to the POC CurrPoc. When the motion vector to be scaled is a motion vector of a block arranged chronologically adjacent to the block to be coded, the POC ColPicPoc is equal to a POC of the picture ColPic.

In principle, the motion vector my is scaled on the basis of the ratio of time intervals between the images and calculated according to Equations (6) and (7).

$$mvx'=mvx \cdot (CurrPoc-CurrRefPoc)/(ColPicPoc-ColRefPoc) \quad (6)$$

$$mvy'=mvy \cdot (CurrPoc-CurrRefPoc)/(ColPicPoc-ColRefPoc) \quad (7)$$

Since the divisions of Equations (6) and (7) include a large calculation amount, the divisions are approximated by a shift operation as indicated by the following Equations (8) and (9).

$$DiffPocD=ColPicPoc-ColRefPoc \quad (8)$$

$$DiffPocB=CurrPoc-CurrRefPoc \quad (9)$$

TDB=Clip3 (−128, 127, DiffPocB); TDD=Clip3 (−128, 127, DiffPocD); iX=(0x4000+abs (TDD/2)/TDD; and Scale=Clip3 (−1024, 1023, (TDB*iX+32)>>6), where Clip3 (x, y, z) is a function that returns medians of x, y and z. The calculated Scale is a scaling coefficient. When Scale=256, Scale means a coefficient that indicates 1. The scaling calculation is performed according to the following Equations (10) and (11).

$$mvx=(Scale*mvx+128)>>8 \quad (10)$$

$$mvy=(Scale*mvy+128)>>8 \quad (11)$$

In the scaling calculation, >> indicates an arithmetic right shift operation.

In the aforementioned manner, a predicted motion vector candidate is generated. Next, the merge mode is described.

The merge mode may be considered to be the same as or similar to the direct mode in H.264/MPEG-4 AVC. In HEVC, however, the number of predicted motion vector candidates increases, compared with H.264/MPEG-4 AVC.

In the merge mode, prediction flags that indicate a validity or invalidity of the reference image list L0 and a validity or invalidity of the reference image list L1, reference indexes of the reference image lists L0 and L1, and prediction information of motion vectors of the reference image lists L0 and L1, are used without a change, while the prediction flags, the reference indexes and the prediction information are included in blocks arranged spatially or chronologically adjacent to the block to be processed.

When the prediction flags indicate that the reference image list L0 is valid and the reference image list L1 is invalid, the prediction flags mean unidirectional prediction to be performed using the reference image list L0. When the prediction flags indicate that the reference image list L0 is invalid and the reference image list L1 is valid, the prediction flags mean unidirectional prediction to be performed using the reference image list L1. When the prediction flags indicate that the reference image lists L0 and L1 are valid, the prediction flags mean bi-directional prediction. When the prediction flags indicate that the reference image lists L0 and L1 are invalid, the prediction flags mean intra-frame prediction. The prediction flags may not be used. In this case, when a reference image identifier is an index that is not included in a reference image list, the reference image identifier may indicate that the reference image list is invalid. When the reference image identifier is an index that is included in the reference image list, the reference image identifier may indicate that the reference image list is valid.

A candidate list of prediction information items is created. An index that is included in the candidate list specifies a prediction information item to be used. When motion compensation is performed on the block (to be processed) using the same prediction information item as a block arranged adjacent to the block to be processed, a motion vector and the like are not coded and the index included in the list is coded. Thus, the prediction information item that is used for the block to be processed may be supplied to the moving image decoding device. The amount of data to be coded, therefore, may be reduced. A merge flag indicates whether the merge mode is valid or invalid. The index that is included in the prediction information candidate list is a merge index that is index information.

Positional relationships between the block to be processed and blocks arranged adjacent to the block to be processed are described with reference to FIG. 7. Symbols A0, A1, B0, B1 and B2 indicate blocks included in an image that includes the block to be processed. The blocks A0, A1, B0, B1 and B2 are arranged spatially adjacent to the block to be processed. A symbol Col indicates a block that is included in an image processed in the past and is arranged chronologically adjacent to the block to be processed. In HM 4.0, up to five of the six adjacent blocks are listed in the prediction information candidate list. When any of the adjacent blocks is a block to be used for intra-frame prediction, a prediction information item of the block is not included in the prediction information candidate list. When a plurality of prediction information items of which all items such as reference image identifiers and vector information items match exist, the prediction information items are redundant and a duplicated prediction information item among the prediction information items is removed.

As illustrated in FIGS. 8A and 8B, if the number of coded data candidates changes due to the removal of the redundant prediction information item, assignment of codes corresponding to indexes to the coded data candidates changes.

In this case, if an error occurs in a certain image due to failure of data and the values of a certain vector are not properly decoded due to the error, the values of a vector, which is arranged chronologically adjacent to the certain vector and belongs to an image referenced as a block arranged chronologically adjacent to a block of the certain image that is treated as an image Col, are not properly decoded, and a redundant candidate to be removed by an encoder does not match a redundant candidate to be removed by a decoder. Thus, the number of candidates in the moving image coding device does not match the number of candidates in the moving image decoding device.

Thus, for the image that is treated as the image Col and in which the error has occurred, the numbers of candidates do not match. All data that includes a vector and a block for which an index is not properly decoded is not properly decoded, and the error is transferred. It is, therefore, desirable that the number of candidates be fixed or the candidates be generated from coding information of the image.

When the number of candidates is fixed, the prediction information candidate list does not include a certain number of candidates, and codes whose number is not the number of valid candidates included in the prediction information candidate list and is equal to or smaller than the certain number of candidates are assigned to indexes, a code is assigned to an index that is not used. Thus, redundancy occurs, and the coding efficiency is reduced.

In HM 4.0, the number of candidates is fixed. Thus, when the number of candidates included in the prediction information candidate list is lower than the fixed number of candidates, a zero vector may be added so as to fill the prediction information candidate list while a reference image identifier is shifted.

Next, a representative method for decoding a moving image is described. As illustrated in FIG. 9, a moving image decoding device 500 receives a bit stream of a compressed moving image and includes an entropy decoder 501, an inverse quantization unit 502, an inverter 503, a decoded image generator 504, a decoded image accumulation unit 505, a predicted decoded image block generator 506 and a selector 509. The predicted decoded image block generator 506 includes an intra-frame prediction image generator 507 and an inter-frame prediction image generator 508.

The outlines of the functional units of the moving image decoding device 500 are described below.

The entropy decoder 501 receives the bit stream, performs entropy decoding (variable-length decoding, arithmetic decoding or the like) on the bit stream, and outputs a quantization coefficient and additional information that describes coding parameters used for coding. The entropy decoding is to decode entropy-coded data having a variable-length code assigned thereto on the basis of an appearance frequency of a symbol and thereby restore the data.

The inverse quantization unit 502 inversely quantizes the quantization coefficient received from the entropy decoder 501 and outputs a restoration frequency coefficient that is a frequency coefficient obtained by performing discrete cosine transform on an error. Since the quantization is performed during the coding, the restoration frequency coefficient includes a quantization error.

The inverter 503 performs inverse discrete cosine transform on the restoration frequency coefficient output from the inverse quantization unit 502 and outputs a predicted deviation image to be restored. The inverse quantization unit 502 and the inverter 503 perform the decoding and obtain differential information that is the same as or similar to the predicted deviation image before the coding.

The decoded image generator 504 adds the predicted deviation image to a predicted decoded image block output from the predicted decoded image block generator 506, and outputs a decoded image.

The decoded image accumulation unit 505 accumulates the decoded image output from the decoded image generator 504 and additional information describing coding parameters corresponding to the decoded image, and outputs the decoded image and the additional information to the predicted decoded image block generator 506.

The predicted decoded image block generator 506 receives the decoded image and the additional information, and generates a predicted decoded image block that is a predicted value of a block to be decoded. The predicted decoded image block generator 506 outputs the predicted decoded image block to the decoded image generator 504 through the selector 509.

As a process that is performed in the predicted decoded image block generator 506, the intra-frame prediction image generator 507 performs intra-frame prediction using information of pixel values of an image to be currently decoded and the additional information, and thereby generates a predicted decoded image block. As a process that is performed in the predicted decoded image block generator 506, the inter-frame prediction image generator 508 receives one or more decoded images and the additional information, performs inter-frame prediction and thereby generates a predicted decoded image block.

The inter-frame prediction image generator 508 is described below in detail.

As illustrated in FIG. 10, the inter-frame prediction image generator 508 includes a motion compensation unit 602, acquires a decoded image and additional information from the decoded image accumulation unit 505 and outputs an inter-frame prediction image. The additional information includes a time (POC) to display the image, the positions of decoded blocks, the sizes of the decoded blocks and motion vectors selected when the blocks have been coded. The decoded image includes information of coding parameters that have been used to code the image and are pixel values of the decoded image, a time (POC) to display the image, the sizes of divided blocks, a prediction mode (intra-frame prediction or inter-frame prediction) and the like.

The outlines of functional units of the inter-frame prediction image generator 508 are described below.

A predicted motion vector candidate generator 601 receives the decoded image output from the decoded image accumulation unit 505 and the additional information describing the coding parameters including the motion vectors used for the coding, and outputs a predicted motion vector candidate.

The motion compensation unit 602 receives the decoded image, the predicted motion vector candidate and the additional information describing the coding parameters including the motion vectors used for the coding, and outputs the inter-frame prediction image.

The embodiments are described later in relation to the predicted motion vector candidate generator 601. The predicted motion vector candidate generator 601 operate in a similar manner to the predicted motion vector candidate generator 301 illustrated in FIG. 4, and a description of operations of the predicted motion vector candidate generator 601 is omitted.

"ISO/IEC 13818, Generic coding of moving pictures and associated audio information" and "ISO/IEC 14496-10, MPEG-4 Part 10 Advanced Video Coding" are examples of related art.

SUMMARY

According to an aspect of the embodiment, a method of coding a moving image includes extracting, as a standard vector, a vector used to code a specific block that belongs to a coded field picture arranged chronologically adjacent to a field picture to be coded and arranged chronologically adjacent to a block to be coded, generating a predicted motion vector by scaling the standard vector on the basis of a temporal distance between the field picture to be coded and a second coded field picture specified by a reference index and referenced for the block that is to be coded and is included in the field picture to be coded and a temporal distance between a first coded field picture pointed by the standard vector and the coded field picture arranged chronologically adjacent to the field picture to be coded, and correcting the predicted motion vector on the basis of a parity of the field picture to be coded, a parity of the first coded field picture, a parity of the second coded field picture and a parity of the coded field picture arranged chronologically adjacent to the field picture to be coded and forming the corrected predicted motion vector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 8A and 8B illustrate differences between codes due to different numbers of candidates;

DESCRIPTION OF EMBODIMENTS

Before embodiments are described, problems that are posed by the aforementioned related-art techniques and have been discussed by the present inventors are described below.

When an interlaced picture is coded in the merge mode or the MVP mode, the coding efficiency is reduced. This is due to the fact that when a field picture is to be coded in the merge mode or the MVP mode, and parities of the following four field pictures are different from each other, an error corresponding to the differences occur in a motion vector. The four field pictures are the field picture to be coded, a coded field picture specified by a reference index and referenced for a block (to be coded) of the field picture to be coded, a coded field picture specified by a reference index refIdx (=0) of a reference list of pictures arranged on the same side as or opposite side to a picture to be used for prediction, and a coded field picture that is referenced for a block spatially arranged at the same position as the block (to be coded) of the field picture and is specified by a reference index refIdx (=0) of a reference list of pictures arranged on the same side as or opposite side to the picture to be used for prediction. Thus, a predicted motion vector is not a proper motion vector, and the coding efficiency is reduced.

Figure 1:
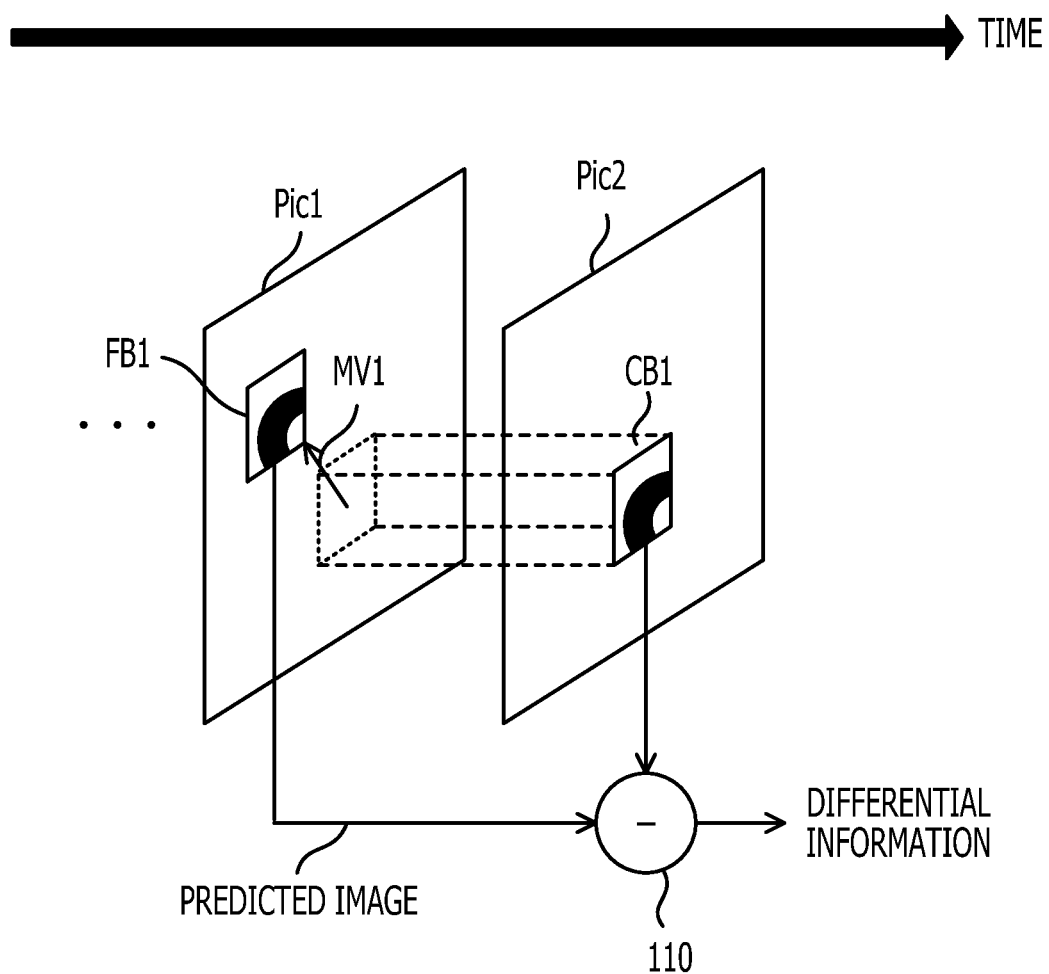
FIG. 1 illustrates inter-frame prediction.
Figure 2:
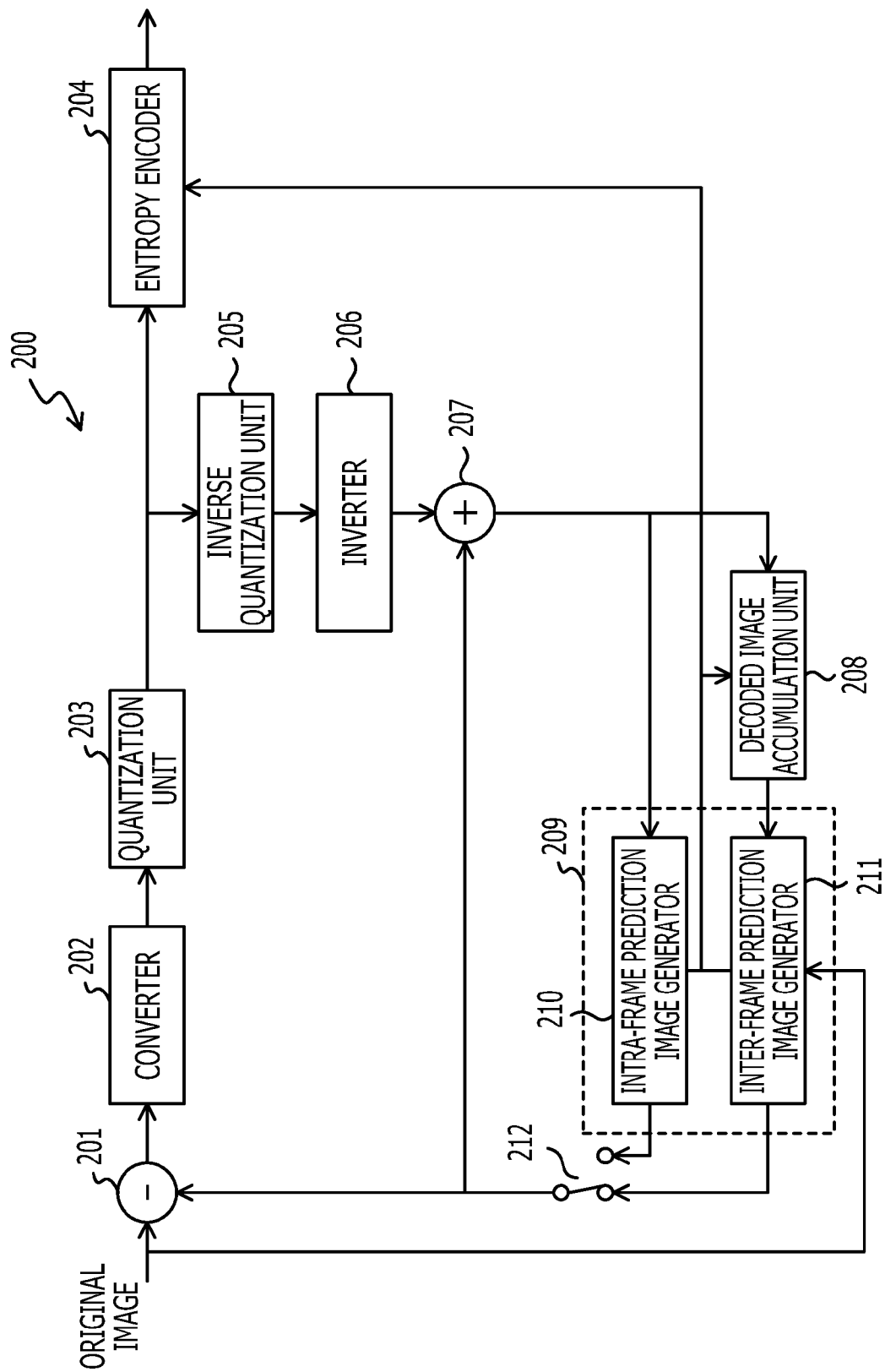
FIG. 2 illustrates the configuration of a moving image coding device of related art.
Figure 3:
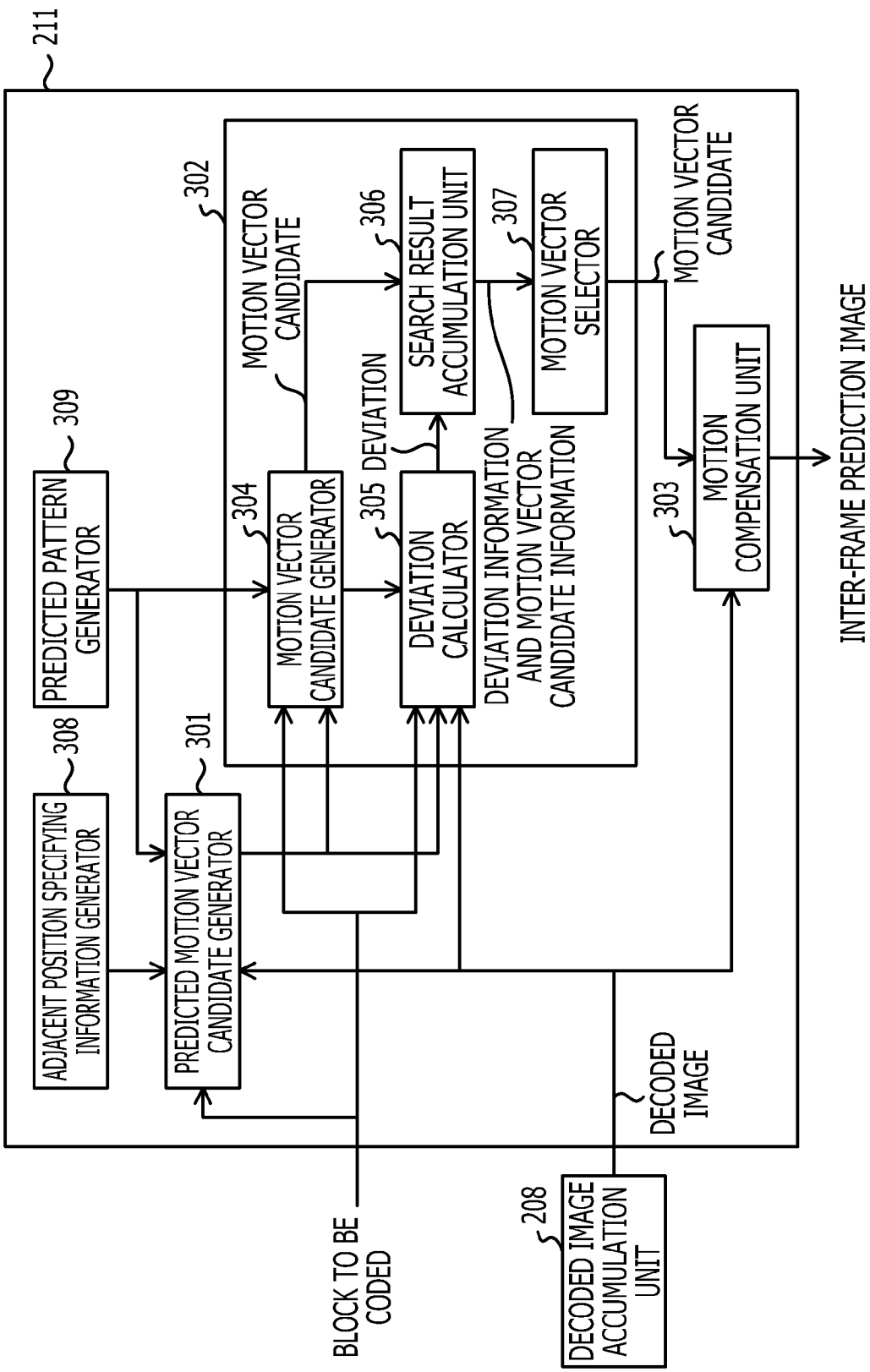
FIG. 3 illustrates the configuration of an inter-frame prediction image generator (of an encoder) of related art.
Figure 4:
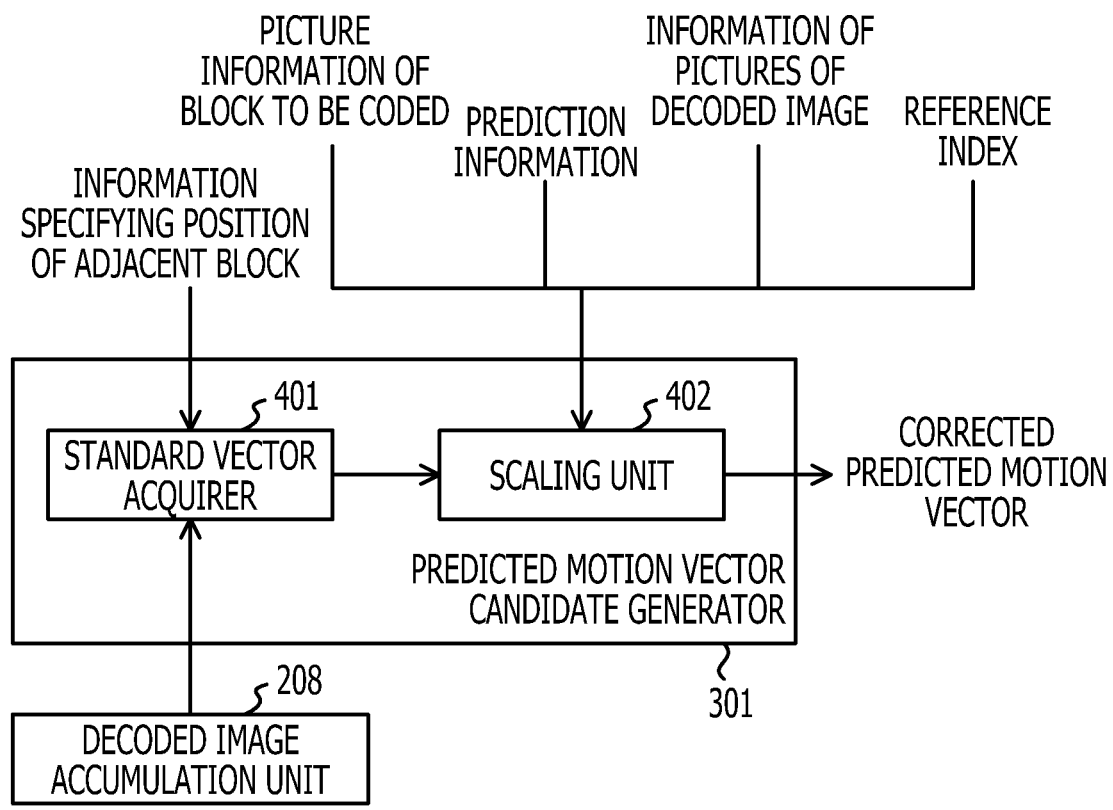
FIG. 4 illustrates the configuration of a predicted motion vector candidate generator.
Figure 5:
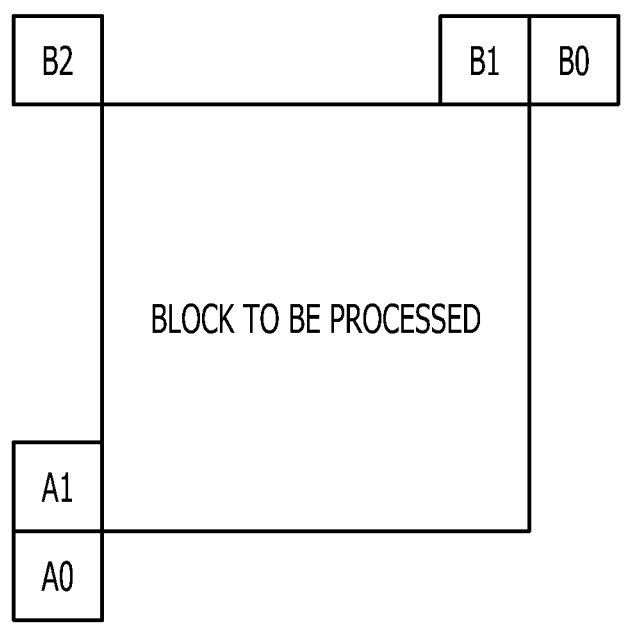
FIG. 5 illustrates the positions of spatially adjacent blocks.
Figure 6:
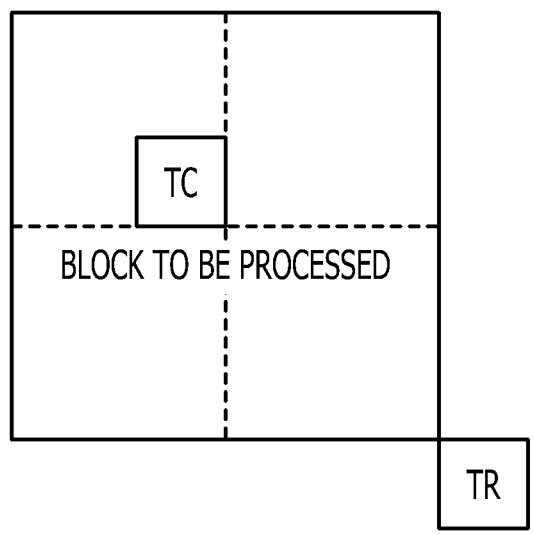
FIG. 6 illustrates the position of a specific block.
Figure 7:
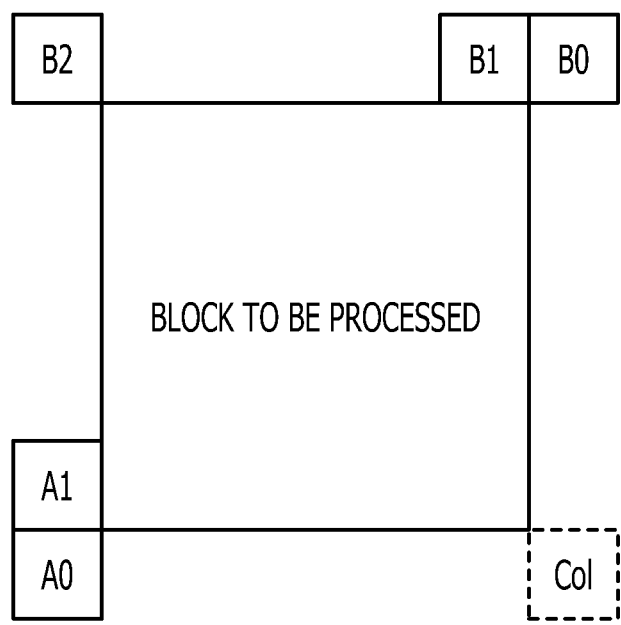
FIG. 7 illustrates the positions of adjacent blocks in a merge mode.
Figure 9:
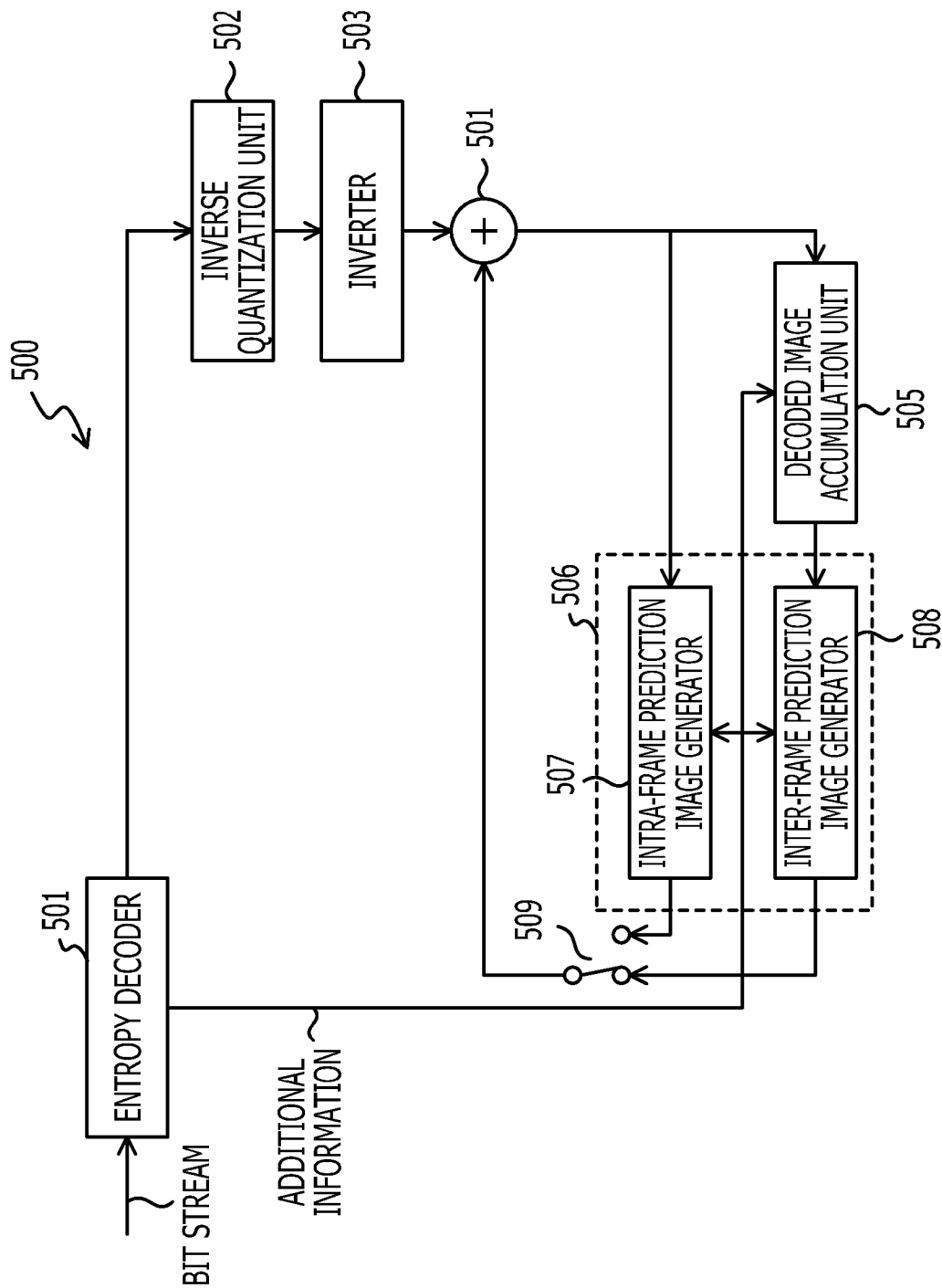
FIG. 9 illustrates the configuration of a moving image decoding device of related art.
Figure 10:
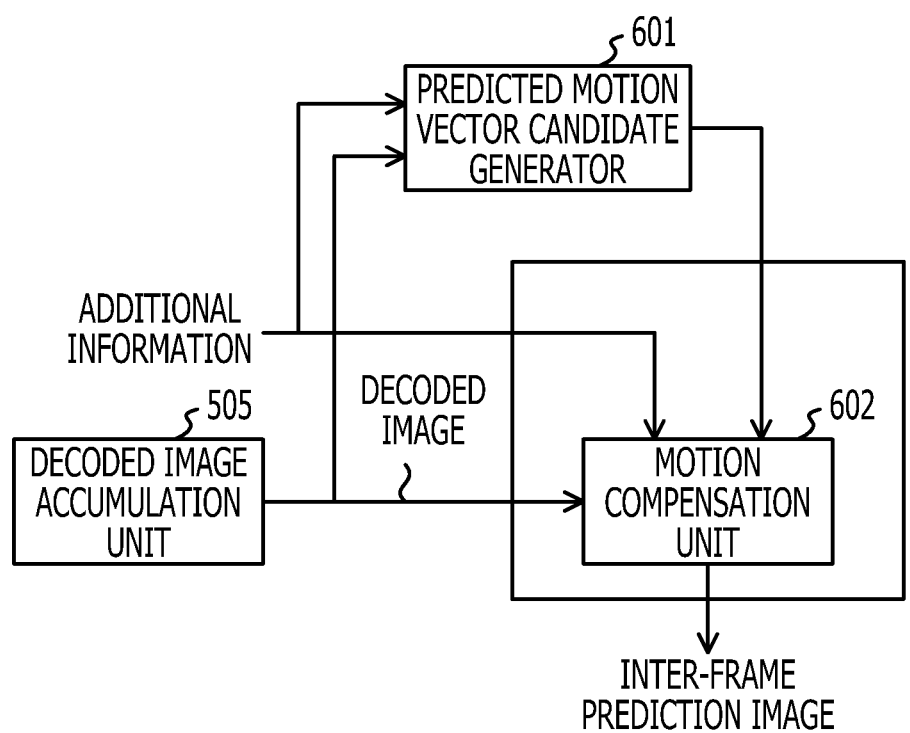
FIG. 10 illustrates the configuration of an inter-frame prediction image generator (of a decoder) of related art.
Figure 11:
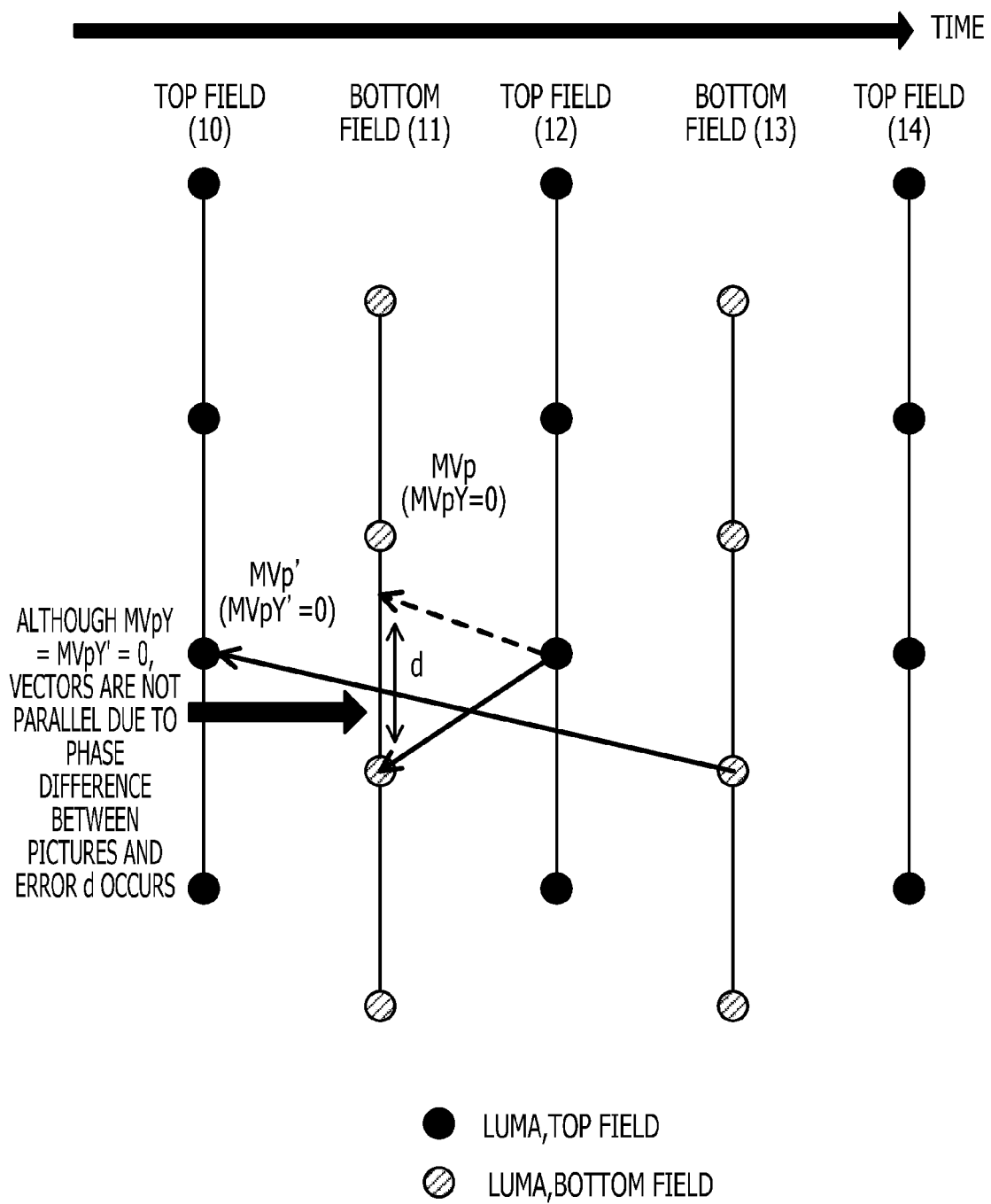
FIG. 11 illustrates a vector error caused by the difference between parities of pictures.

The aforementioned problems are described below with reference to FIG. 11.

For moving images having a field picture, a top field (10), a bottom field (11), a top field (12), a bottom field (13) and a top field (14) are chronologically arranged in this order and input. In this field structure, pixels of the bottom fields (11) and (13) are shifted by a half pixel from pixels of the top fields (10), (12) and (14).

For example, it is assumed that a field picture to be coded is the top field (12), a coded field picture specified by a reference index refIdx (=0) of a reference list of pictures arranged on the same side as or opposite side to a picture to be used for prediction is the bottom field (13), a parity of a coded field picture that is specified by a reference index refIdx (=0) of a reference list of pictures arranged on the same side as or opposite side to the picture to be used for prediction and is pointed by a vector used to code a block spatially located at the same position as a block to be coded indicates the top field (10), a coded field picture specified by a reference index and referenced for the block (to be coded) of the picture to be coded is the bottom field (11), and a vector that belongs to a coded field picture specified by a reference index refIdx (=0) of a reference list of pictures arranged on the same side as or opposite side to the picture to be used for prediction and has been used to code the block spatially located at the same position as the block to be coded is a vector MVpY' and used as a predicted motion vector without a change. Based on the assumption, even when MVpY'=MVpY=0, the vectors MVpY and MVpY' are not parallel to each other, and an error d (error corresponding to ⅔ pixels) of the motion vector occurs as illustrated in FIG. 11. In the actual space, a vector is specified on a quarter pixel basis, and an error corresponding to 8/3 pixels (0.5 pixels obtained by rounding ⅔ pixels) occurs.

The predicted motion vector does not point the original position and whereby the coding efficiency is reduced.

Hereinafter, a coding device disclosed herein and a decoding device disclosed herein are described with reference to the accompanying drawings.

Figure 12:
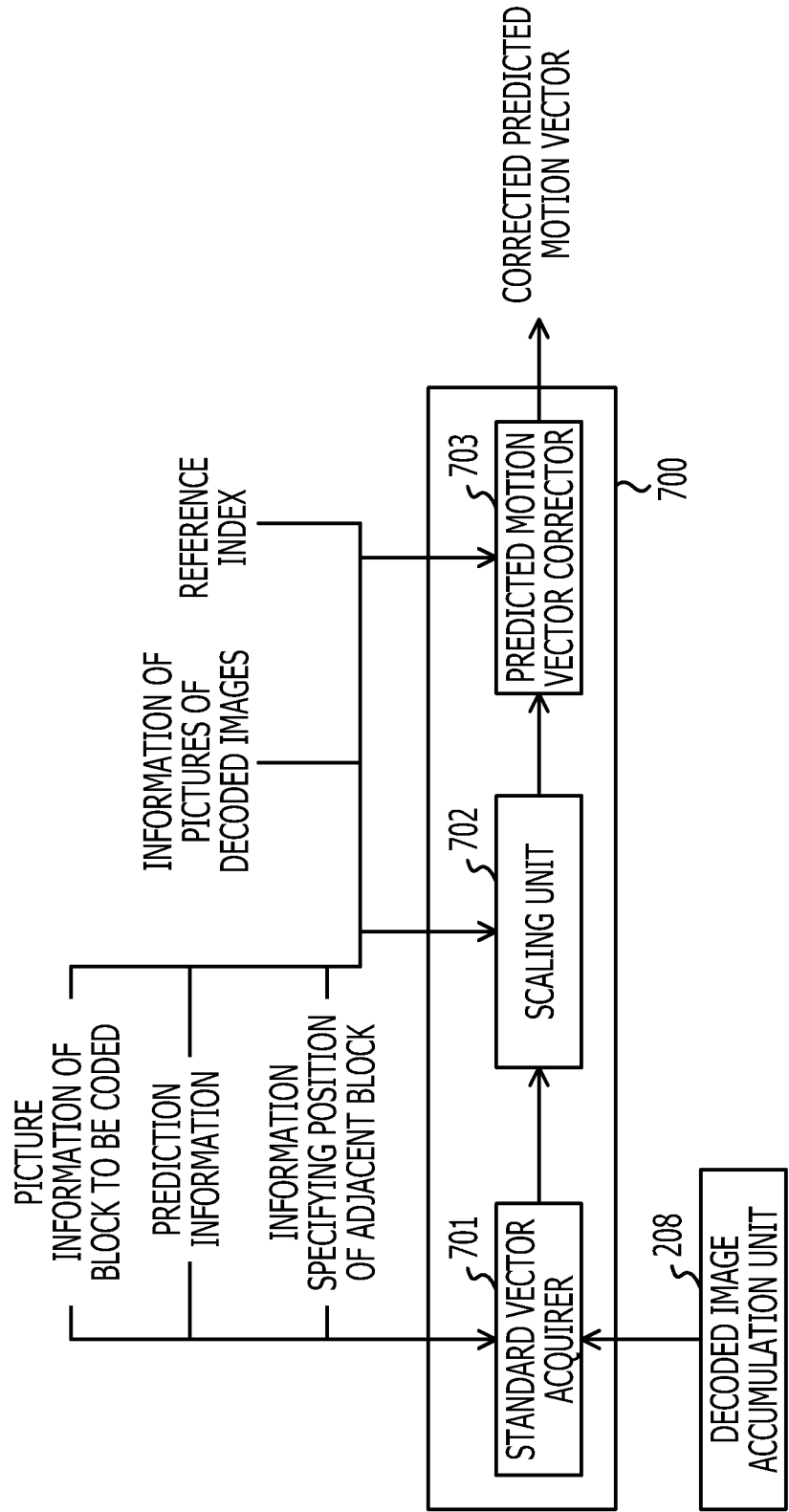
FIG. 12 illustrates a predicted motion vector candidate generator according to a first embodiment.

The configuration of a predicted motion vector generator 700 that is included in a moving picture coding device according to a first embodiment is described with reference to FIG. 12. It is assumed that the accuracy of motion vectors is ¼ pixels and a motion vector corresponding to one pixel is represented by 4.

The predicted motion vector generator 700 according to the first embodiment receives picture information of a block to be coded, information of pictures of decoded images, prediction information, a motion vector output from the decoded image accumulation unit 208 and belonging to a block arranged adjacent to the block to be coded, information specifying the position of the adjacent block, and a reference index specifying a coded picture pointed by a motion vector of the block to be coded. The predicted motion vector generator 700 includes a standard vector acquirer 701, a scaling unit 702 and a predicted motion vector corrector 703, and outputs a corrected predicted motion vector.

The decoded image accumulation unit 208 accumulates additional information of motion vectors used to code the decoded images and the like.

The standard vector acquirer 701 receives the information specifying the position of the adjacent block, the prediction information and the picture information of the block to be coded, receives a motion vector from the decoded image accumulation unit 208 and outputs, as a standard vector, information of the motion vector of the adjacent block located at the position specified by the information.

The scaling unit 702 receives the standard vector, the picture information of the block to be coded, the information of the pictures of the decoded images, the prediction information and the reference index. The scaling unit 702 scales the standard vector on the basis of a POC of the picture to be coded, a POC of a picture (second coded field picture) included in a second decoded image and specified by a reference index, a POC of a picture (third coded field picture) that is included in a third decoded image and from which the standard vector is derived, and a POC of a picture (first coded field picture) included in a first decoded image and specified by the standard vector. The scaling unit 702 outputs a predicted motion vector.

The predicted motion vector corrector 703 receives the predicted motion vector output from the scaling unit 702, the reference index, the picture information of the block to be coded, the information of the pictures of the decoded images, and the prediction information. The predicted motion vector corrector 703 references a parity of the picture to be coded, a parity of the picture included in the second decoded image and specified by the reference index, a parity of the picture included in the third decoded image and from which the standard vector is derived, and a parity of the picture included in the first decoded image and specified by the standard vector. The predicted motion vector corrector 703 corrects the predicted motion vector on the basis of the referenced parities, and outputs the corrected predicted motion vector.

Figure 13:
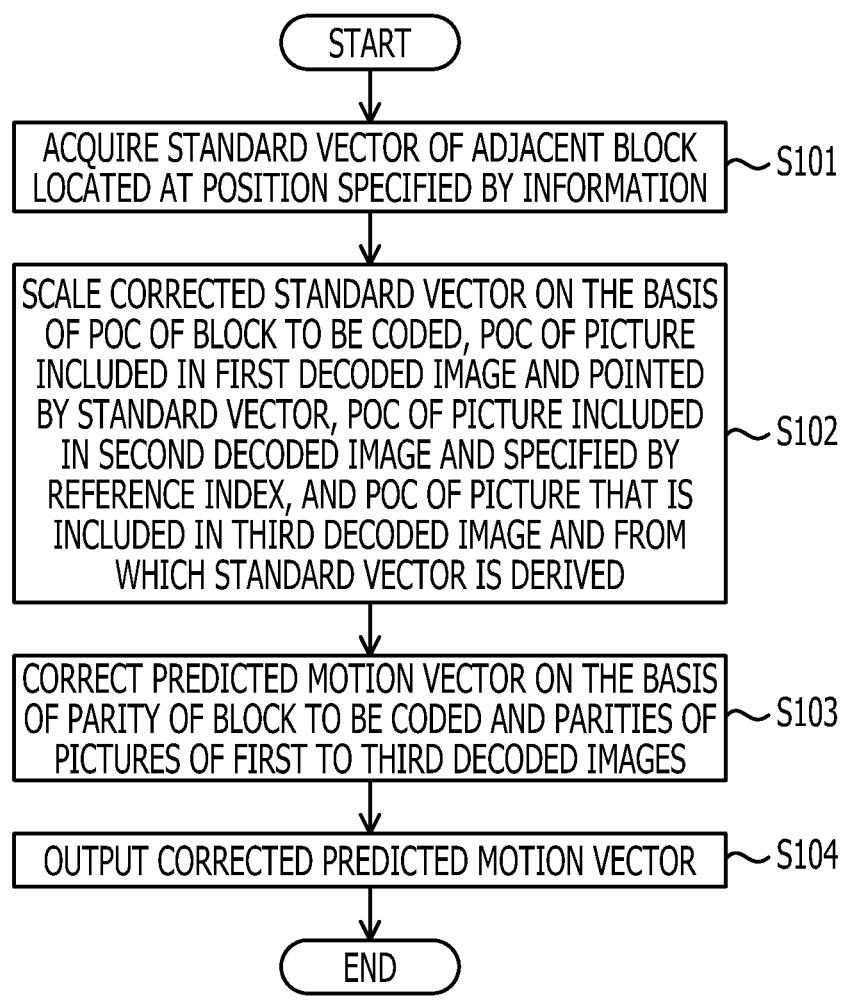
FIG. 13 is a flowchart of a process that is performed by the predicted motion vector candidate generator according to the first embodiment.

The flow of a process according to the present embodiment is described below with reference to FIG. 13. The process is described using detailed values with reference to FIG. 14.

First, in step S101, the standard vector acquirer 701 acquires a motion vector MVp (MVpX, MVpY) of a block arranged chronologically adjacent to the block to be coded from information of the position of the block to be coded, the prediction information, the information specifying the position of the coded block arranged adjacent to the block to be coded, and the motion vector supplied from the decoded image accumulation unit 208, and outputs the motion vector MVp as the standard vector.

As described above, regardless of whether the mode is the MVP mode or the merge mode, the block that is arranged chronologically adjacent to the block to be coded is located on the bottom right side of a block (block Col) corresponding to the block (to be coded) or is located at the center of the block Col when a predicted motion vector located on the bottom right side is not acquired. Thus, the position of the block arranged chronologically adjacent to the block to be coded is one position.

Figure 14:
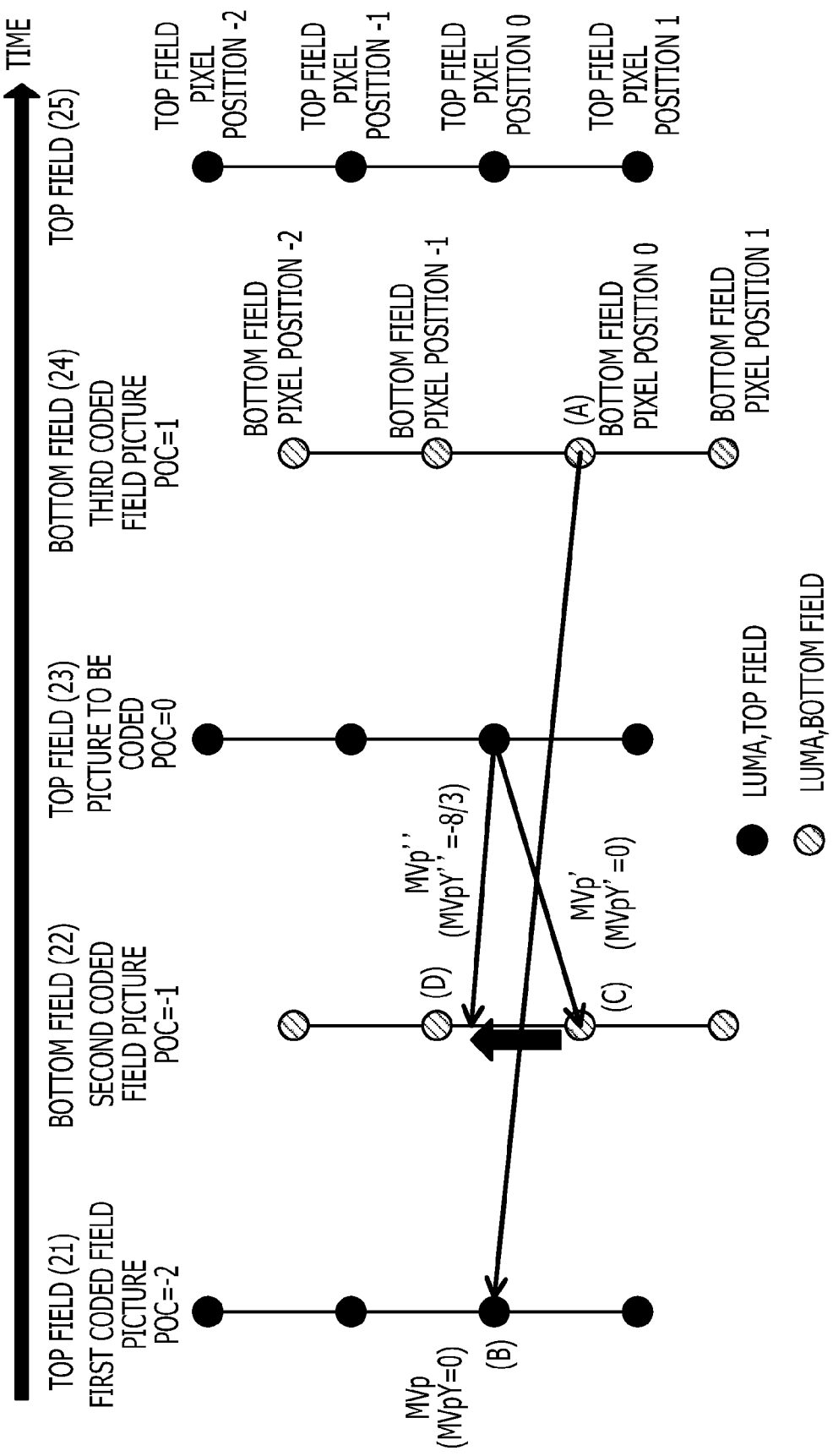
FIG. 14 illustrates a correction of a predicted motion vector according to the first embodiment.

In an example illustrated in FIG. 14, since the motion vector MVp points from the position 0 (A) of a pixel of a bottom field (24) to the position 0 (B) of a pixel of a top field (21), MVpY=0 (In the actual space, since the vector is specified on a quarter pixel basis, one pixel is treated as 4).

Since there are differences between parities in Y direction, vectors in Y direction are described.

Next, in step S102, the scaling unit 702 receives the picture information of the block to be coded, the information of the pictures of the decoded images, the prediction information and the reference index, scales the standard vector MVp, and outputs a predicted motion vector MVp'. A POC of the field picture that includes the block to be coded and is to be coded is indicated by PocCurr. A POC of the picture that is included in the third decoded image and from which the standard vector is derived is indicated by PocCol. A POC of the picture that is included in the second decoded image and specified by the reference index is indicated by PocRef2. A POC of the picture that is included in the first decoded image and pointed by the standard vector is indicated by PocRef1. The scaling is represented by the following Equation (12).

$$MVpY'=MVpY*(PocRef2-PocCurr)/(PocRef1-PocCol) \quad (12)$$

In Equation (12), a symbol MVpY' indicates the predicted motion vector. In the example illustrated in FIG. 14, the predicted motion vector MVpY' is calculated according to the following Equation (13).

$$MVpY'=0*(-1-0)/(-2-1)=0 \quad (13)$$

In this case, the predicted motion vector MVpY' is equal to 0, i.e., corresponds to 0 pixels. The predicted motion vector MVpY' is indicated by a vector (C) on a top field (23) illustrated in FIG. 14. The vector (C) is not parallel to the standard vector and not a vector obtained by properly scaling the standard vector. Thus, the vector (C) is corrected as described below.

Subsequently, in step S103, the predicted motion vector corrector 703 receives the picture information of the block to be coded, the information of the pictures of the decoded images, the prediction information and the reference index, corrects the predicted motion vector MVp' so as to obtain the corrected predicted motion vector MVp" on the basis of a parity (isBottomFieldCurr) of the field picture to be coded, a parity (isBottomFieldRef2) of the picture included in the second decoded image and specified by the reference index, a parity (isBottomFieldCol) of the picture included in the third decoded image and from which the standard is derived, and a parity (isBottolFieldRef1) of the picture included in the first decoded image and pointed by the standard vector. When the parities isBottomFieldCurr, isBottomFieldRef1, isBottomFieldCol and isBottomFieldRef2 are 1, the parities indicate the bottom fields. When the parities isBottomFieldCurr, isBottomFieldRef1, isBottomFieldCol and isBottomFieldRef2 are 0, the parities indicate the top fields.

The corrected predicted motion vector MVp" may be calculated according to the following Equation (14).

$$MVpY"=MVpY'+2*(isBottomFieldRef1-isBottomFieldCol)*(PocRef2-PocCurr)/(PocRef1-PocCol)+2*(isBottomFieldCurr-isBottomFieldRef2) \quad (14)$$

The corrected predicted motion vector MVp" illustrated in FIG. 14 is calculated as indicated by Equation (15).

$$MVpY"=0+2*(0-1)*(-1-0)/(-2-1)+2*(0-1)=-8/3 \quad (15)$$

The corrected predicted motion vector MVp" is −8/3. In the example illustrated in FIG. 14, the corrected predicted motion vector MVp" is indicated by a vector (D). The vector (D) is parallel to the standard vector and is a properly scaled vector.

Thus, the predicted motion vector MVp" may be obtained by properly scaling the standard vector MVp.

Finally, in step S104, the predicted motion vector corrector 703 outputs the proper predicted motion vector.

The example illustrated in FIG. 14 describes that the parity of the field pointed by the standard vector MVp indicates the top field, the parity of the field from which the standard vector MVp is derived indicates the bottom field, the parity of the field pointed by the predicted motion vector MVpY" indicates the bottom field, and the parity of the field from which the predicted motion vector MVpY' indicates the top field.

When the standard vector MVpY is scaled, MVpY'=0 (0 pixels) and the scaled vector is the vector (C) on the bottom field (22). The vector (C) is corrected by a value of −8/3 (actually ½ pixels due to rounding) and thereby becomes the proper vector (D) for the top field (23).

The position of an adjacent block referenced and specified is described for the MVP mode and the merge mode. When the adjacent block is chronologically adjacent to the block to be coded, the adjacent block may be used for prediction. Even when a mode other than the aforementioned two modes is specified as a prediction mode, the adjacent block may be used for prediction.

Figure 15:
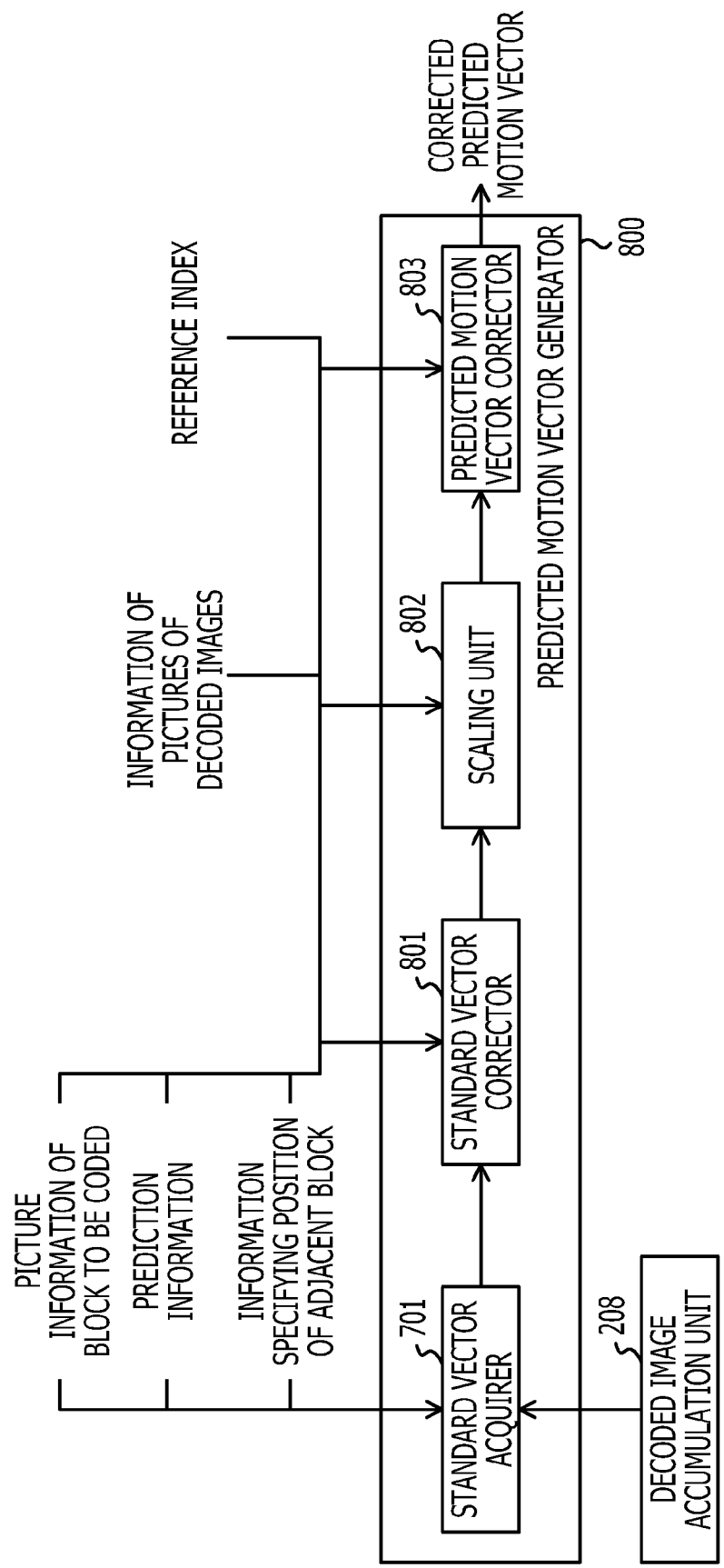
FIG. 15 illustrates a predicted motion vector candidate generator according to a second embodiment.

FIG. 15 illustrates the configuration of a predicted vector candidate generator 800 included in a moving image coding device according to a second embodiment. It is assumed that the accuracy of motion vectors is ¼ pixels and a motion vector corresponding to one pixel is represented by 4.

The predicted motion vector generator 800 according to the second embodiment receives picture information of a block to be coded, information of pictures of decoded images, prediction information, a motion vector (output from the decoded image accumulation unit 208) of a block arranged adjacent to the block to be coded, information specifying the position of the adjacent block, a reference index specifying a picture included in a decoded image and pointed by a motion vector of the block to be coded. The predicted motion vector generator 800 according to the second embodiment includes a standard vector acquirer 701, a standard vector corrector 801, a scaling unit 802 and a predicted motion vector corrector 803 and outputs a corrected predicted motion vector.

The decoded image accumulation unit 208 accumulates motion vectors used to code decoded pictures.

The standard vector acquirer 701 receives the information specifying the position of the adjacent block, the prediction information and the picture information of the block to be coded and receives a motion vector from the decoded image accumulation unit 208. The standard vector acquirer 701 outputs, as a standard vector, information of the motion vector of the adjacent block arranged at the position specified by the information.

The standard vector corrector 801 receives the picture information of the block to be coded, the information of the pictures of the decoded images, the prediction information and the standard vector, and corrects the standard vector using a parity of a picture (third coded field picture) that is included in a third decoded image and from which the standard vector is derived and a parity of a picture (first coded field picture) included in a first decoded image and pointed by the standard vector. The standard vector corrector 801 outputs the corrected standard vector.

The scaling unit 802 receives the corrected standard vector, the picture information of the block to be coded, the information of the pictures of the decoded images, the prediction information and the reference index. The scaling unit 802 scales the corrected standard vector on the basis of a POC of a picture to be coded, a POC of a picture (second coded field picture) included in a second decoded image and specified by the reference index, a POC of the picture included in the third decoded image and from which the standard vector is derived, and a POC of the picture included in the first decoded image and specified by the standard vector. The scaling unit 802 outputs a predicted motion vector.

The predicted motion vector corrector 803 receives the predicted motion vector output from the scaling unit 802, the reference index, the picture information of the block to be coded, the information of the pictures of the decoded images and the prediction information. The predicted motion vector corrector 803 references the parity of the picture to be coded and the parity of the picture included in the second decoded image and specified by the reference index, corrects the predicted motion vector and outputs the corrected predicted motion vector.

Figure 16:
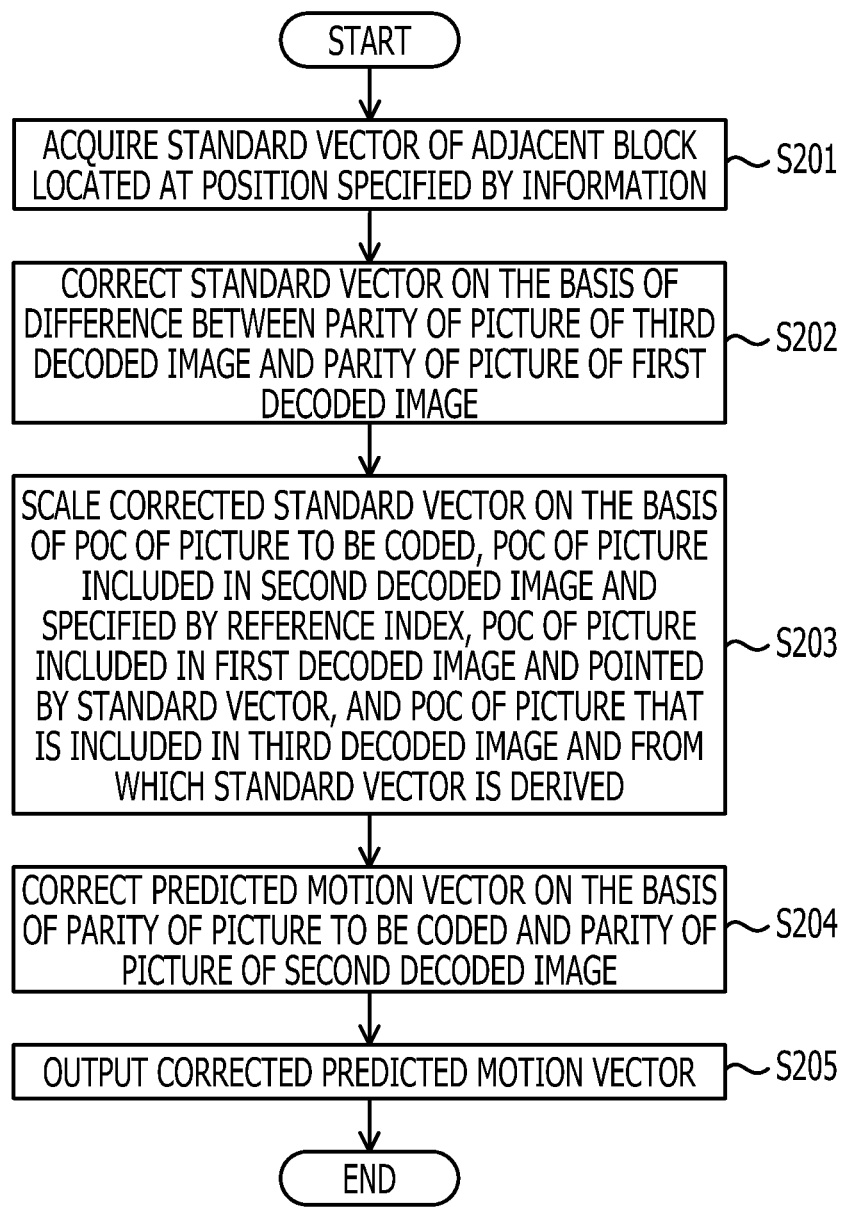
FIG. 16 is a flowchart of a process that is performed by the predicted motion vector candidate generator according to the second embodiment.

The flow of a process according to the second embodiment is described with reference to FIG. 16. The process according to the second embodiment is described using detailed values with reference to FIG. 17.

First, in step S201, the standard motion vector acquirer 701 acquires a motion vector MVp (MVpX, MVpY) of a block arranged chronologically adjacent to the block to be coded from information of the position of the block to be coded, the prediction information, the information specifying the position of the coded block arranged adjacent to the block to be coded and the motion vector supplied from the decoded image accumulation unit 208. The standard motion vector acquirer 701 outputs the motion vector MVp as the standard vector.

As described above, regardless of whether the mode is the MVP mode or the merge mode, the block that is arranged chronologically adjacent to the block to be coded is located on the bottom right side of a block (block Col) corresponding to the block (to be coded) or is located at the center of a block Col when a predicted motion vector located on the bottom right side is not acquired. Thus, the position of the block arranged chronologically adjacent to the block to be coded is one position.

Figure 17:
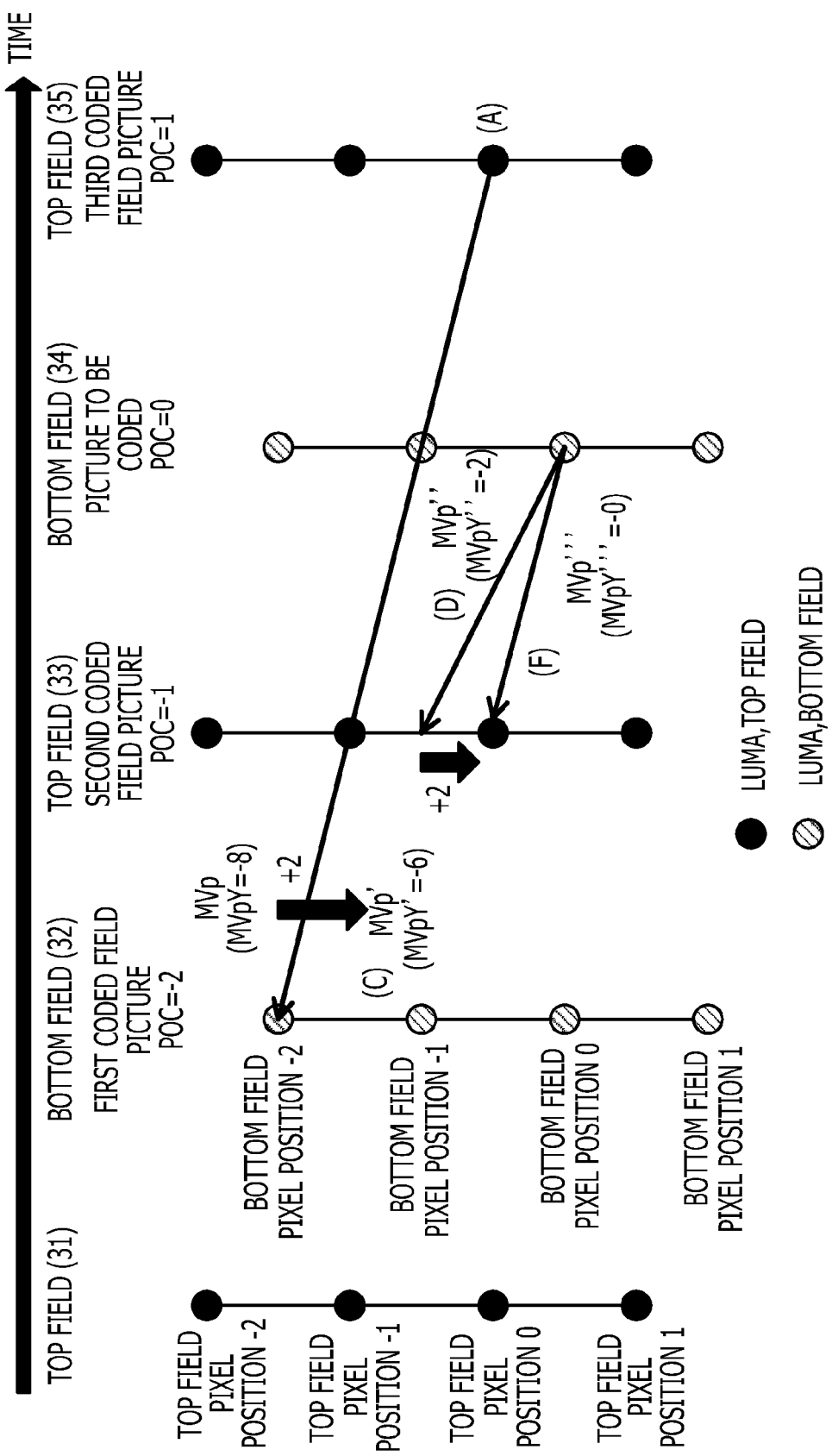
FIG. 17 illustrates a correction of a predicted motion vector according to the second embodiment.

In an example illustrated in FIG. 17, since the standard vector points from the position 0 (A) of a pixel of a top field (35) to the position (−2) of a pixel of a bottom field (32), MVpY=−8. Since there are differences between parities in Y direction, vectors in Y direction are described.

Next, in step S202, the standard vector corrector 801 receives the picture information of the block to be coded, the information of the pictures of the decoded images and the prediction information, corrects the standard vector MVp on the basis of the parity of the picture that is included in the third decoded image and from which the standard vector is derived, and the parity of the picture included in the first decoded image and pointed by the standard vector, and the standard vector corrector 801 outputs the corrected standard vector MVp'. A Y-directional vector MVpY' of the corrected standard vector MVp' may be calculated according to the following Equation (16).

$$MVpY'=MVpY+2*(isBottomFieldRef1-isBottomFieldCol) \quad (16)$$

In the example illustrated in FIG. 17, the corrected standard vector MVpY' is calculated according to the following Equation (17).

$$MVpY'=-8+2*(1-0)=-6 \quad (17)$$

The corrected standard vector MVp' is indicated by a vector (C) illustrated in FIG. 17. In Equation (16), a symbol isBottomFieldCol is the parity of the picture included in the third decoded image and from which the standard vector is derived, while a symbol isBottomFieldRef1 is the parity of the picture included in the first decoded image and pointed by the standard vector. When the pictures of the first and third decoded images are top fields, the parities isBottomFieldCol and isBottomFieldRef1 are 0. When the pictures of the first and third decoded images are bottom fields, the parities isBottomFieldCol and isBottomFieldRef1 are 1.

Subsequently, in step S203, the scaling unit 802 receives the picture information of the block to be coded, the information of the pictures of the decoded images, the prediction information and the reference index, scales the corrected standard vector MVp', and outputs a predicted motion vector MVp". A POC of the picture that is to be coded and to which the block to be coded belongs is indicated by PocCurr. A POC of the picture included in the first decoded image and pointed by the standard vector is indicated by PocRef1. A POC of the picture included in the second decoded image and specified by the reference index is indicated by PocRef2. A POC of the picture that is included in the third decoded image and from which the standard vector is derived is indicated by PocCol. The scaling is represented by the following Equation (18).

$$MVpY''=MVpY'*(PocRef2-PocCurr)/(PocRef1-PocCol) \quad (18)$$

A symbol MVpY" indicates a predicted motion vector. In the example illustrated in FIG. 17, the predicted motion vector MVpY" is calculated according to the following Equation (19).

$$MVpY''=-6*(-1-0)/(-2-1)=-2 \quad (19)$$

In this case, the predicted motion vector MVpY" is $-2$, which corresponds to a half pixel. The predicted motion vector MVpY" is a vector indicated by (D) illustrated in FIG. 17 and is derived from a bottom field.

Subsequently, in step S204, since the predicted motion vector MVpY" is not a vector obtained by properly scaling the standard vector, the predicted motion vector MVpY" is corrected as described below. The predicted motion vector corrector 803 receives the picture information of the block to be coded, the information of the pictures of the decoded images, the prediction information and the reference index, corrects the predicted motion vector MVpY" on the basis of the parity of the picture that is to be coded and to which the block to be coded belongs, and the parity of the picture included in the second decoded image and specified by the reference index. The corrected predicted motion vector is indicated by MVp'". A Y-directional vector of the corrected predicted motion vector MVp'" may be calculated according to the following Equation (20).

$$MVpY'''=MVpY''+2*(isBottomFieldCurr-isBottomFieldRef2) \quad (20)$$

In the example illustrated in FIG. 17, the corrected predicted motion vector MVpY'" is calculated according to the following Equation (21).

$$MVpY'''=-2+2*(1-0)=0 \quad (21)$$

In this case, the corrected predicted motion vector MVpY'" is 0 and indicated by a vector (F) illustrated in FIG. 17. The corrected predicted motion vector MVpY'" is parallel to the standard vector and is a properly scaled vector.

Thus, the corrected predicted motion vector MVp'" may be obtained by properly scaling the original standard vector MVp.

Finally, in step S205, the predicted motion vector corrector 803 outputs the proper predicted motion vector.

The example illustrated in FIG. 17 describes that the parity of the field referenced by the standard vector indicates the bottom field, the parity of the field from which the standard vector is derived indicates the top field, the parity of the field referenced by the predicted motion vector indicates the top field, and the parity of the field from which the predicted motion vector is derived indicates the bottom field.

The standard vector MVpY is corrected by a value of +2, and whereby the corrected standard vector MVpY' in the actual space is $-6$ and indicated by the vector (C). When the corrected standard vector MVpY' is scaled, the scaled vector MVpY" is $-2$ (corresponding to a half pixel) and is the vector (D) on the top field (35). Finally, in order to set the vector (D) to be parallel to the standard vector, the vector MVpY" is corrected by a value of +2. Thus, the motion vector MVpY'" is obtained and indicated by the vector (F).

As a reference, operations when parities of the following four pictures are different from each other and a motion vector is to be corrected using the method described in the second embodiment are described with reference to FIGS. 18 to 21. The four pictures are a picture that is to be coded and to which a block to be coded belongs, a picture (hereinafter referred to as picture (second coded field picture)) that is included in a second decoded image, referenced for the block (to be coded) and specified by a reference index, a picture (hereinafter referred to as picture (third coded field picture) or picture ColPic) included in a third decoded image and specified by a reference index refIdx (=0) of a reference list of pictures arranged on the side of a picture to be used for prediction, and a picture (hereinafter referred to as picture (first coded field picture)) included in a first decoded image and pointed by a vector used to code a block that is included in the picture of the third decoded image and located at the same position as the block to be coded. In examples illustrated in FIGS. 18 to 21, the reference index refIdx (=0) included in the reference list is fixed when the reference index refIdx (=0) specifies a picture that is included in a decoded image and arranged chronologically adjacent to the picture to be coded. In the examples illustrated in FIGS. 18 to 21, however, the index refIdx (=0) may specify a picture that is included in a decoded image and is not arranged chronologically adjacent to the picture to be coded. Even in this case, the index refIdx (=0) may be applied to the present embodiment.

The first embodiment describes that the case in which the picture to be coded is the top field, the picture of the second decoded image is the bottom field, the picture of the third decoded image is the bottom field, and the picture of the first decoded image is the top field. The second embodiment describes that the picture to be coded is the bottom field, the picture of the second decoded image is the top field, the picture of the third decoded image is the top field and the picture of the first decoded image is the bottom field. Those cases are omitted in the examples illustrated in FIGS. 18 to 21.

Figure 18:
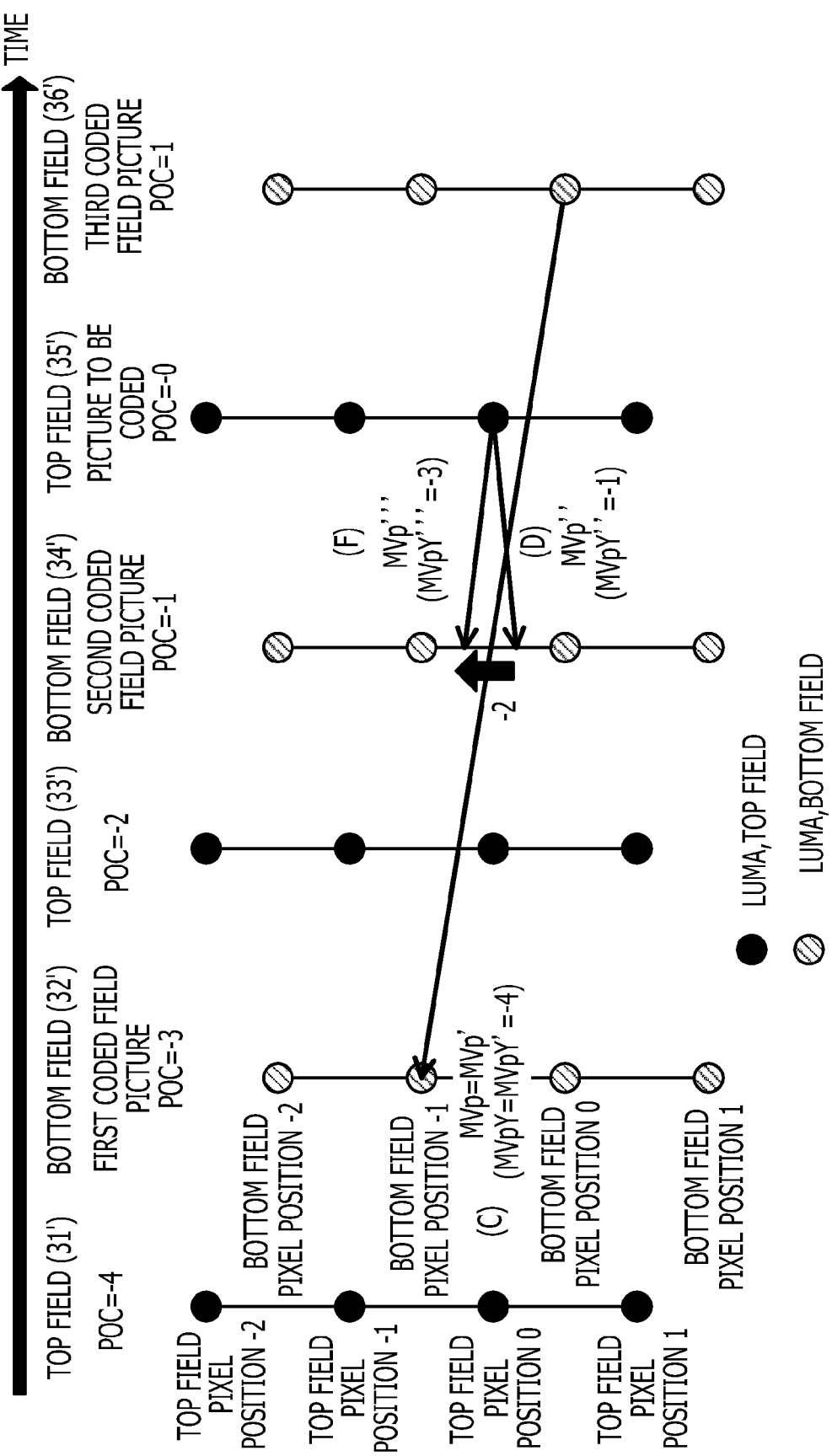
FIG. 18 illustrates a correction of a predicted motion vector when a picture to be coded is a top field, a picture of a second decoded image is a bottom field, a picture of a first decoded image is a bottom field, and a picture of a third decoded image is a bottom field.

FIG. 18 illustrates the case in which the picture to be coded is a top field, the picture of the second decoded image is a bottom field, the picture of the third decoded image is a bottom field and the picture of the first decoded image is a bottom field.

Figure 19:
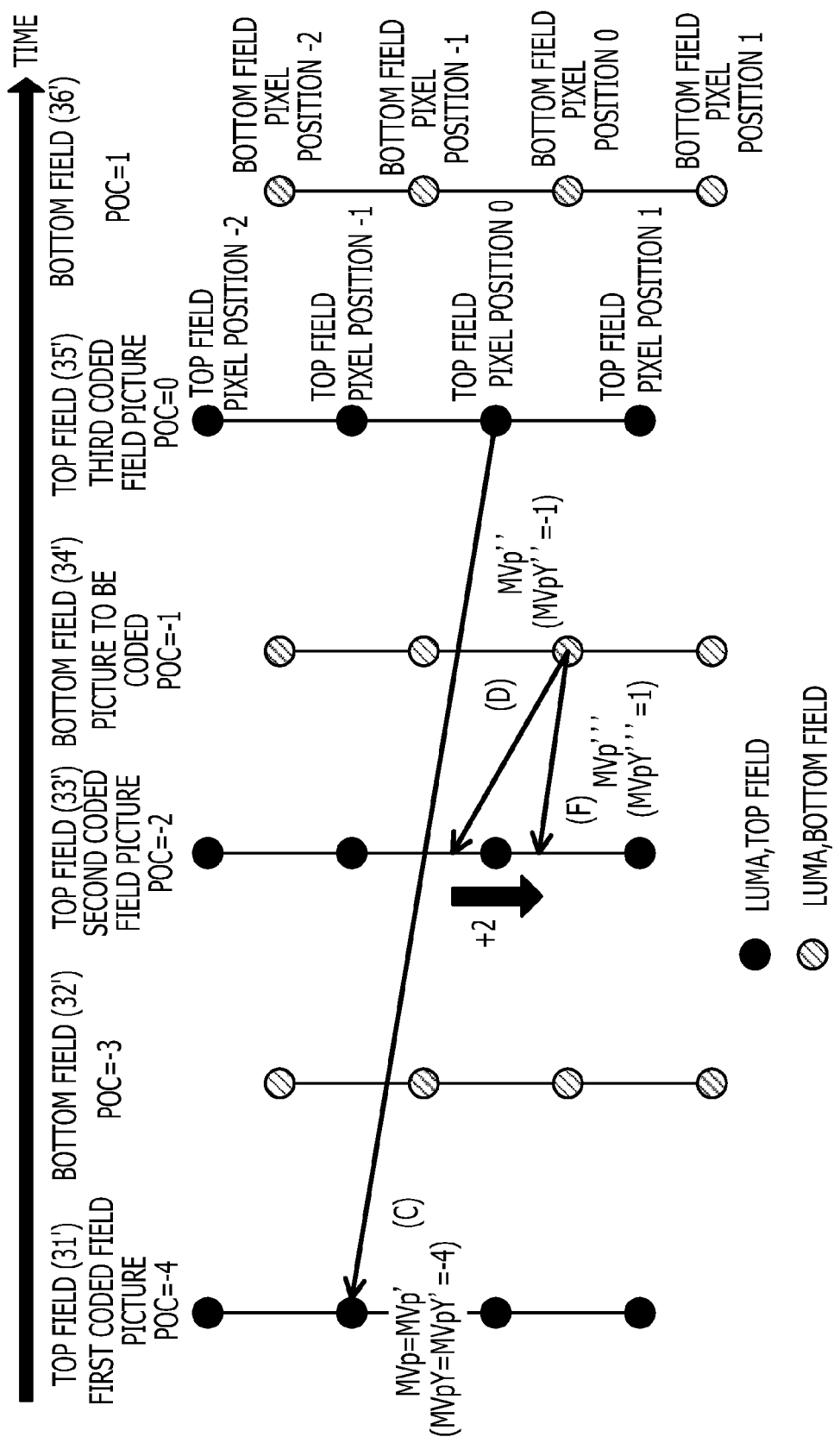
FIG. 19 illustrates a correction of a predicted motion vector when the picture to be coded is a bottom field, the picture of the second decoded image is a top field, the picture of the first decoded image is a top field, and the picture of the third decoded image is a top field.

FIG. 19 illustrates the case in which the picture to be coded is a bottom field, the picture of the second decoded image is a top field, the picture of the third decoded image is a top field and the picture of the first decoded image is a top field.

Figure 20:
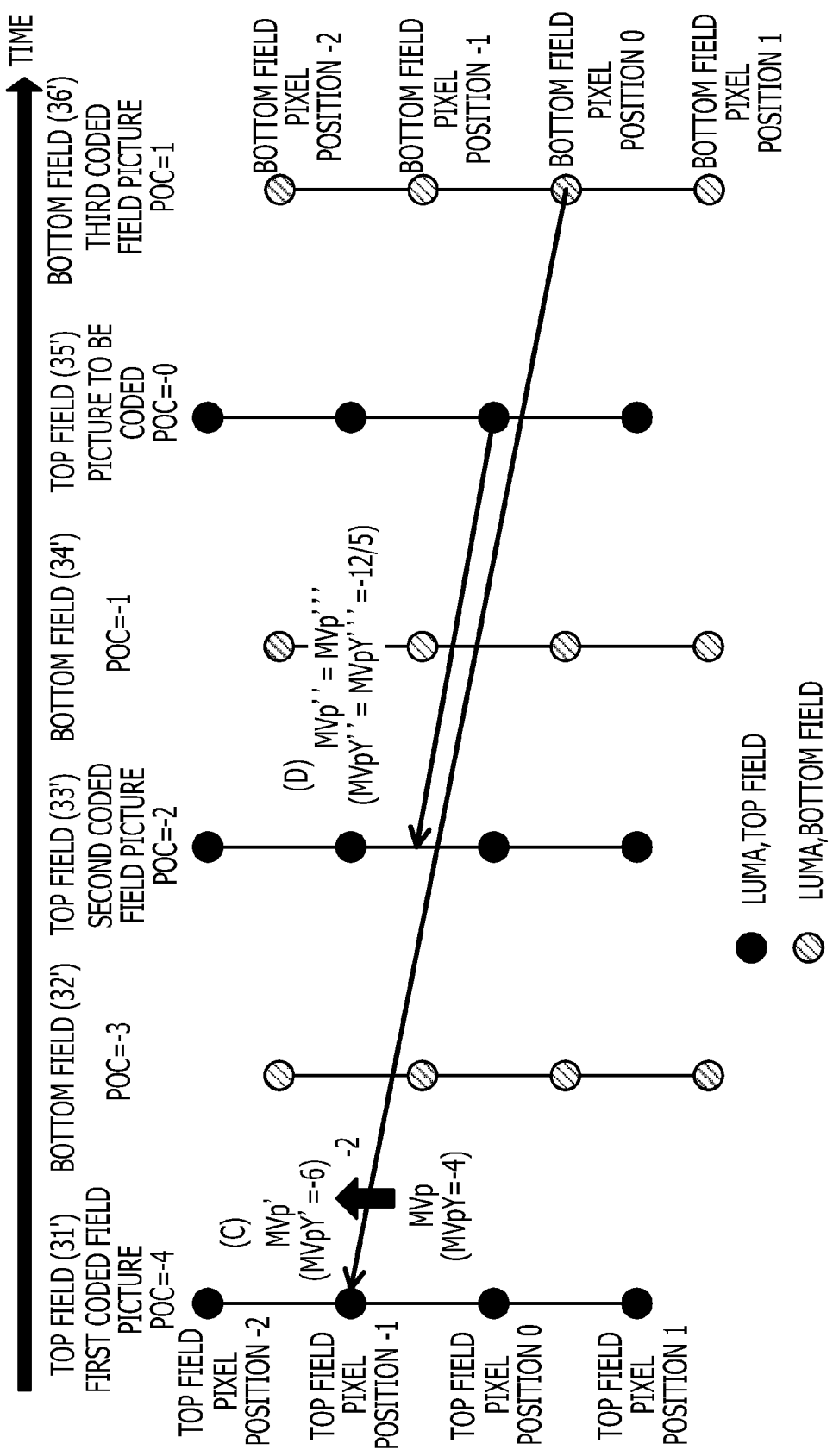
FIG. 20 illustrates a correction of a predicted motion vector when the picture to be coded is a top field, the picture of the second decoded image is a top field, the picture of the first decoded image is a top field, and the picture of the third decoded image is a bottom field.

FIG. 20 illustrates the case in which the picture to be coded is a top field, the picture of the second decoded image is a top field, the picture of the third decoded image is a bottom field and the picture of the first decoded image is a top field.

Figure 21:
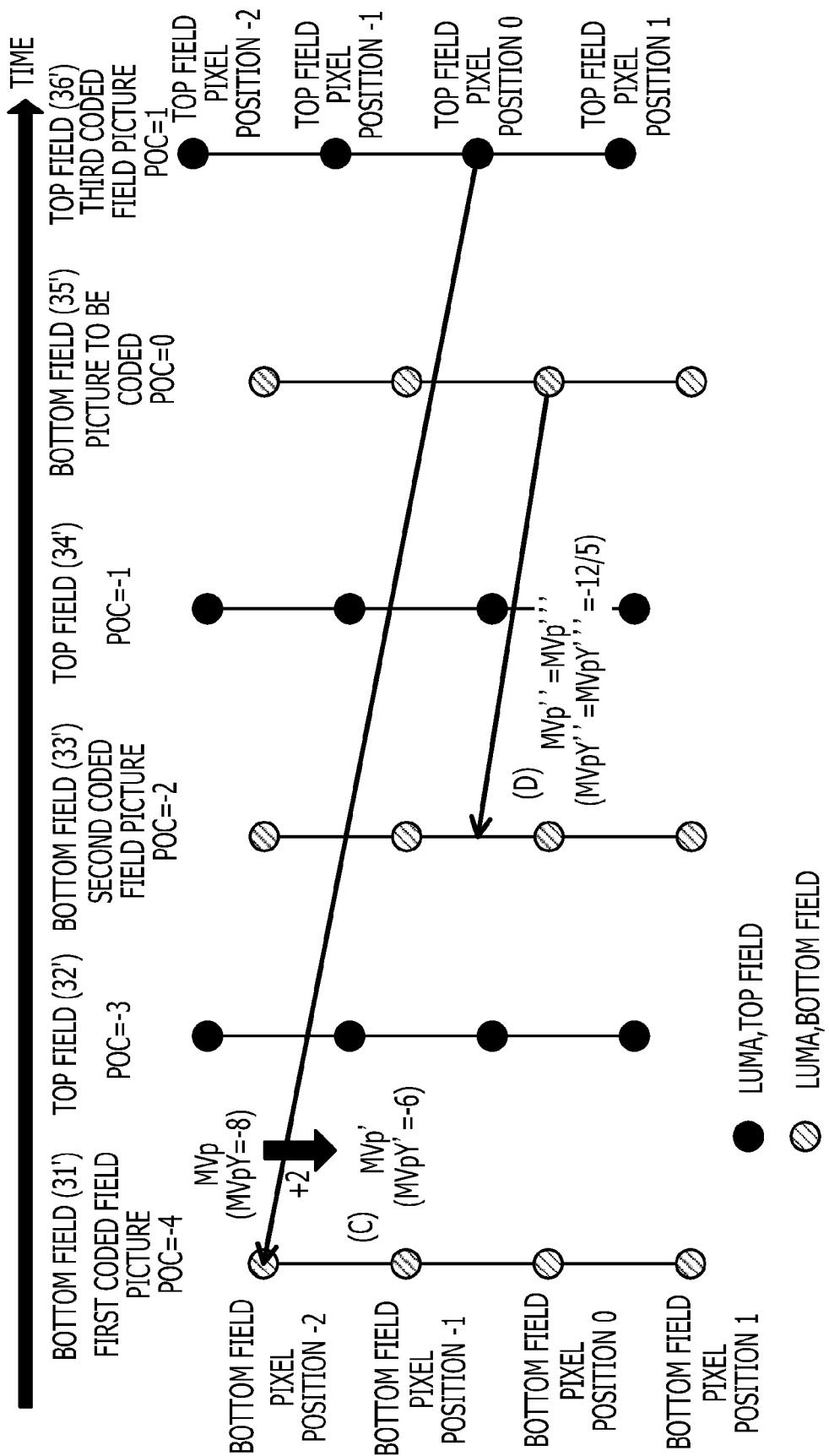
FIG. 21 illustrates a correction of a predicted motion vector when the picture to be coded is a bottom field, the picture of the second decoded image is a bottom field, the picture of the first decoded image is a bottom field, and the picture of the third decoded image is a top field.

FIG. 21 illustrates the case in which the picture to be coded is a bottom field, the picture of the second decoded image is a bottom field, the picture of the third decoded image is a top field and the picture of the first decoded image is a bottom field.

In the example illustrated in FIG. 18, a parity of the field referenced by a standard vector indicates the bottom field, a parity of the field from which the standard vector is derived indicates the bottom field, a parity of the field referenced by a predicted motion vector indicates the bottom field, and a parity of the field from which the predicted motion vector is derived indicates the top field.

Since the parity of the field referenced by the standard vector and the parity of the field from which the standard vector are equal to each other, the standard vector is not corrected, and a vector MVpY=MVpY'=−4 and is indicated by a vector (C). When the vector MVpY' is scaled, the scaled vector MVpY"=−1 (0.25 pixels). When the parity of the field referenced by the predicted motion vector indicates the bottom field and the parity of the field from which the predicted motion vector is derived indicates the top field, the vector MVpY" is indicated by a vector (D). When the vector MVpY" is corrected by a value of −2 (½ pixels), the corrected vector MVpY'''=−3 (−0.75 pixels) and is a proper vector (F) on the top field.

In the example illustrated in FIG. 19, a parity of the field referenced by a standard vector indicates the top field, a parity of the field from which the standard vector indicates the top field, a parity of the field referenced by a predicted motion vector indicates the top field, and a parity of the field from which the predicted motion vector is derived indicates the bottom field.

Since the parity of the field referenced by the standard vector and the parity of the field from which the standard vector is derived are equal to each other, the standard vector is not corrected, and a vector MVpY=MPvY'=−4 and is indicated by a vector (C). When the vector MVpY' is scaled, the scaled vector MVpY"=−1 (0.25 pixels). When the parity of the field referenced by the predicted motion vector indicates the top field and the parity of the field from which the predicted motion vector is derived indicates the bottom field, the vector MVpY" is indicated by a vector (D). When the vector MVpY" is corrected by a value of +2 (½ pixels), the corrected vector MVpY'''=1 (−0.25 pixels) and is a proper vector (F) on the bottom field.

In the example illustrated in FIG. 20, a parity of the field referenced by a standard vector indicates the top field, a parity of the field from which the standard vector is derived indicates the bottom field, a parity of the field referenced by a predicted motion vector indicates the top field, and a parity of the field from which the predicted motion vector is derived indicates the top field.

The standard vector MVpY is corrected by a value of −2. The corrected standard vector MVpY' is the standard vector in the actual space. The corrected standard vector MVpY'=−6 and is indicated by a vector (C). When the vector MVpY' is scaled, the scaled vector MVpY"=−12/5. When the parity of the field referenced by the predicted motion vector and the parity of the field from which the predicted motion vector is derived indicate the top fields, the vector MVpY" is indicated by a vector (D). In this case, since the parity of the field referenced by the predicted motion vector and the parity of the field from which the predicted motion vector is derived are equal to each other, the predicted motion vector is not corrected. Thus, the vector MVpY"=MVpY'''=−12/5 (actually −0.5 pixels due to rounding) and is indicated by a vector (F).

In the example illustrated in FIG. 21, a parity of the field referenced by a standard vector indicates the bottom field, a parity of the field from which the standard vector is derived indicates the top field, a parity of the field referenced by a predicted motion vector indicates the bottom field, and a parity of the field from which the predicted motion vector is derived indicates the bottom field.

The standard vector MVpY is corrected by a value of +2. The corrected standard value MVpY' is the standard value in the actual space. The corrected standard value MVpY'=−6 and is indicated by a vector (C). When the standard value MVpY' is scaled, the scaled vector MVpY"=−12/5. When the parity of the field referenced by the predicted motion vector and the parity of the field from which the predicted motion vector is derived indicate the bottom fields, the vector MVpY" is indicated by a vector (D). In this case, the parity of the field referenced by the predicted motion vector and the parity of the field from which the predicted motion vector is derived are equal to each other. Thus, the predicted motion vector is not corrected. The vector MVpY"=MVpY'''=−12/5 (actually −0.5 pixels due to rounding) and is indicated by a vector (F).

When the parity of the field referenced by the standard vector and the parity of the field from which the standard vector is derived are equal to each other, and the parity of the field referenced by the predicted motion vector and the parity of the field from which the predicted motion vector is derived are equal to each other, the standard vector or the predicted motion vector is not corrected. In this case, since the scaling is performed in a similar manner to standard software HM, the methods according to the embodiments are not performed.

According to the aforementioned embodiments, even when each of frames includes two fields, and the moving picture coding device performs motion compensation prediction on fields arranged chronologically adjacent to each other and codes each of the fields, the moving picture coding device obtains a proper predicted motion vector and suppresses a reduction in the coding efficiency.

Functional units of the aforementioned embodiments are embodied by a computer including a central processing unit (CPU), a memory that stores a program, a storage and a interface circuit. For example, the CPU executes, based on the program, procedures (operations) of the aforementioned embodiments to embody the functional units. For example, the CPU may include one or more processors. The memory may be a Random Access Memory (RAM). The storage may be a Read Only Memory (ROM), Solid State Drive (SSD) or Hard Disk Drive (HDD). The interface circuit may be a Network Interface Card (NIC).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of coding a moving image, the method comprising:
    extracting, as a standard vector, a vector used to code a specific block that belongs to a coded field picture arranged chronologically adjacent to a field picture to be coded and arranged chronologically adjacent to a block to be coded;
    generating a predicted motion vector by scaling the standard vector on the basis of a temporal distance between the field picture to be coded and a second coded field picture specified by a reference index and referenced for the block that is to be coded and is included in the field picture to be coded and a temporal distance between a first coded field picture pointed by the standard vector and the coded field picture arranged chronologically adjacent to the field picture to be coded; and
    correcting the predicted motion vector on the basis of a parity of the field picture to be coded, a parity of the first coded field picture, a parity of the second coded field picture and a parity of the coded field picture arranged chronologically adjacent to the field picture to be coded and forming the corrected predicted motion vector.

2. The method according to claim 1,
    wherein the predicted motion vector is corrected on the basis of the parity of the field picture to be coded, the parity of the first coded field picture and the parity of the second coded field picture, and thereby becomes parallel to the standard vector.

3. The method according to claim 1,
    wherein the predicted motion vector is generated according to an first equation: the predicted motion vector=(the size of the standard vector in a vertical direction)*((a time to display the second coded field picture referenced for the block that is to be coded and is included in the field picture to be coded)−(a time to display the field picture to be coded)/(a time to display the first coded field picture pointed by the standard vector)−(a time to display the coded field picture arranged chronologically adjacent to the field picture to be coded)), and
    wherein the predicted motion vector is corrected according to an second equation: the corrected predicted motion vector=(the predicted motion vector)+2*((a value of a flag indicating that the second coded field picture is a bottom field)−(a value of a flag indicating that the coded field picture arranged chronologically adjacent to the field picture to be coded is a bottom field))*((the time to display the second coded field picture referenced for the block that is to be coded and is included in the field picture to be coded)−(the time to display the field picture to be coded))/((the time to display the first coded field picture pointed by the standard vector)−(the time to display the coded field picture arranged chronologically adjacent to the field picture to be coded))+2*((a value of a flag indicating that the field picture to be coded is a bottom field)−(the value of the flag indicating that the second coded field picture is the bottom field)).

4. A method for coding a moving image, the method comprising:
    extracting, as a standard vector, a vector used to code a specific block that belongs to a coded field picture arranged chronologically adjacent to a field picture to be coded and arranged chronologically adjacent to a block to be coded;
    correcting the standard vector on the basis of a parity of the coded field picture arranged chronologically adjacent to the field picture to be coded and a parity of a first coded field picture pointed by the standard vector and forming the corrected standard vector;
    generating a predicted motion vector by scaling the corrected standard vector on the basis of a temporal distance between the field picture to be coded and a second coded field picture specified by a reference index and referenced for the block that is to be coded and is included in the field picture to be coded, and a temporal distance between the first coded field picture and the coded field picture arranged chronologically adjacent to the field picture to be coded; and
    correcting the predicted motion vector on the basis of a parity of the field picture to be coded and a parity of the second coded field picture and forming the corrected predicted motion vector.

5. The method according to claim 4,
    wherein the standard vector is corrected according to an third equation: the corrected standard vector=(the size of the standard vector in a vertical direction)+2*((a value of a flag indicating that a parity of the first coded field picture pointed by the standard vector indicates a bottom field)−(a value of a flag indicating that the parity of the field picture to be coded indicates a bottom field)),
    wherein the predicted motion vector is generated by scaling the corrected standard vector on the basis of the temporal distance between the field picture to be coded and the second coded field picture specified by the reference index and referenced for the block that is to be coded and is included in the field picture to be coded, and the temporal distance between the first coded field picture and the coded field picture arranged chronologically adjacent to the field picture to be coded, and
    wherein the predicted motion vector is corrected according to fourth an equation: the corrected predicted motion vector=(the predicted motion vector)+2*((the value of the flag indicating that the parity of the field picture to be coded indicates the bottom field)−(a value of a flag indicating that a parity of the second coded field picture indicates a bottom field)).

6. A method for decoding a moving image, the method comprising:
    extracting, as a standard vector, a vector used to decode a specific block that belongs to a decoded field picture arranged chronologically adjacent to a field picture to be decoded and arranged chronologically adjacent to a block to be decoded;
    generating a predicted motion vector by scaling the standard vector on the basis of a temporal distance between the field picture to be decoded and a second decoded field picture specified by a reference index and referenced for the block that is to be decoded and is included in the field block to be decoded, and a temporal distance between a first decoded field picture pointed by the standard vector and the decoded field picture arranged chronologically adjacent to the field picture to be decoded; and correcting the predicted motion vector on the basis of a parity of the field picture to be decoded, a parity of the first decoded field picture, a parity of the second decoded field picture and a parity of the decoded field picture arranged chronologically adjacent to the field picture to be decoded and forming the corrected predicted motion vector.

7. The method according to claim 6,
wherein the predicted motion vector is corrected on the basis of the parity of the field picture to be decoded, the parity of the first decoded field picture and the parity of the second decoded field picture, and thereby becomes parallel to the standard vector.

8. The method according to claim 6,
wherein the predicted motion vector is generated according to an fifth equation: the predicted motion vector=(the size of the standard vector in a vertical direction)*((a time to display the second decoded field picture referenced for the block that is to be decoded and is included in the field picture to be decoded)−(a time to display the field picture to be decoded))/((a time to display the first decoded field picture pointed by the standard vector)−(a time to display the decoded field picture arranged chronologically adjacent to the field picture to be decoded)), and wherein the predicted motion vector is corrected according to an sixth equation: the corrected predicted motion vector=(the predicted motion vector)+2*((a value of a flag indicating that the first decoded field picture is a bottom field)−(a value of a flag indicating that the decoded field picture arranged chronologically adjacent to the field picture to be decoded is a bottom field))*((the time to display the second decoded field picture referenced for the block that is to be decoded and is included in the field picture to be decoded)−(the time to display the field picture to be decoded))/((the time to display the first decoded field picture pointed by the standard vector)−(the decoded field picture arranged chronologically adjacent to the field picture to be decoded))+2*((a value of a flag indicating that the field picture to be decoded is a bottom field)−(a value of a flag indicating that the second decoded field picture is a bottom field)).

9. A method for decoding a moving image, the method comprising:
extracting, as a standard vector, a vector used to decode a specific block that belongs to a decoded field picture arranged chronologically adjacent to a field picture to be decoded and arranged chronologically adjacent to a block to be decoded;

correcting the standard vector on the basis of a parity of the decoded field picture arranged chronologically adjacent to the field picture to be decoded and a parity of a first decoded field picture pointed by the standard vector and forming the corrected standard vector;

generating a predicted motion vector by scaling the corrected standard vector on the basis of a temporal distance between the field picture to be decoded and a second decoded field picture specified by a reference index and referenced for the block that is to be decoded and is included in the field picture to be decoded, and a temporal distance between the first decoded field picture and the decoded field picture arranged chronologically adjacent to the field picture to be decoded; and correcting the predicted motion vector on the basis of a parity of the field picture to be decoded and a parity of the second decoded field picture and forming the corrected predicted motion vector.

10. The method according to claim 9,
wherein the standard vector is corrected according to an seventh equation: the corrected standard vector=(the size of the standard vector in a vertical direction)+2*((a value of a flag indicating that a parity of the first decoded field picture pointed by the standard vector indicates a bottom field)−(a value of a flag indicating that the parity of the field picture to be decoded indicates a bottom field)), wherein the predicted motion vector is generated by scaling the corrected standard vector on the basis of the temporal distance between the field picture to be decoded and the second decoded field picture specified by the reference index and referenced for the block that is to be decoded and is included in the field picture to be decoded, and the temporal distance between the first decoded field picture and the decoded field picture arranged chronologically adjacent to the field picture to be decoded, and wherein the predicted motion vector is corrected according to an eighth equation: the corrected predicted motion vector=(the predicted motion vector)+2*((the value of the flag indicating that the parity of the field picture to be decoded indicates the bottom field)−(a value of a flag indicating that a parity of the second decoded field picture indicates a bottom field)).

\* \* \* \* \*